United States Patent
Qi et al.

(10) Patent No.: US 11,031,606 B2
(45) Date of Patent: *Jun. 8, 2021

(54) REVERSIBLE BIFUNCTIONAL AIR ELECTRODE CATALYST FOR RECHARGEABLE METAL AIR BATTERY AND REGENERATIVE FUEL CELL

(71) Applicant: UNIVERSITY OF TENNESSEE RESEARCH FOUNDATION, Knoxville, TN (US)

(72) Inventors: Ming Qi, Knoxville, TN (US); Thomas Zawodzinski, Knoxville, TN (US); Shane Foister, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,921

(22) Filed: Nov. 22, 2019

(65) Prior Publication Data
US 2020/0168915 A1 May 28, 2020

Related U.S. Application Data

(62) Division of application No. 15/033,349, filed as application No. PCT/US2014/063724 on Nov. 3, 2014, now Pat. No. 10,522,842.

(Continued)

(51) Int. Cl.
*H01M 12/08* (2006.01)
*H01M 4/90* (2006.01)
(Continued)

(52) U.S. Cl.
CPC ....... *H01M 4/9008* (2013.01); *H01M 4/8615* (2013.01); *H01M 4/8626* (2013.01);
(Continued)

(58) Field of Classification Search
CPC ... H01M 4/86–8673; H01M 4/90–928; H01M 12/00–085
See application file for complete search history.

(56) References Cited

U.S. PATENT DOCUMENTS 10,522,842 B2 * 12/2019 Qi .................. H01M 4/9041
2004/0024254 A1 2/2004 Yaegashi et al.
(Continued)

FOREIGN PATENT DOCUMENTS

| CN | 101267057 A | 9/2008 |
|---|---|---|
| CN | 102645470 A | 8/2012 |

OTHER PUBLICATIONS

Beloglazkina, E.K. et al., "Gold nanoparticles modified with coordination compounds of metals: synthesis and application," Russian Chemical Reviews 81 (1), pp. 65-90 (2012).
(Continued)

*Primary Examiner* — James Lee
(74) *Attorney, Agent, or Firm* — Brooks Kushman P.C.

(57) ABSTRACT

An electrochemical cell includes an air electrode in flow communication with a storage tank containing an aqueous solution of hydrogen peroxide, a lithium electrode, a catalyst layer in contact with the air electrode or a gas diffusion layer associated with the air electrode, and a separator layer in contact with the lithium electrode and catalyst layer. The catalyst layer includes a catalyst for two electron reversible oxygen reduction. The catalyst comprises gold, and a cobalt coordination complex or polymer thereof. The cobalt coordination complex comprises a cobalt ion chelated by a tetradentate organic chelating ligand.

10 Claims, 19 Drawing Sheets

Related U.S. Application Data

(60) Provisional application No. 61/898,532, filed on Nov. 1, 2013.

(51) Int. Cl.
| | |
|---|---|
| *H01M 4/88* | (2006.01) |
| *H01M 4/86* | (2006.01) |
| *H01M 4/92* | (2006.01) |
| *H01M 12/02* | (2006.01) |
| *H01M 12/06* | (2006.01) |
| *B82Y 40/00* | (2011.01) |
| *B82Y 30/00* | (2011.01) |
| *H01M 4/02* | (2006.01) |

(52) U.S. Cl.
CPC .......... *H01M 4/8647* (2013.01); *H01M 4/88* (2013.01); *H01M 4/8871* (2013.01); *H01M 4/8892* (2013.01); *H01M 4/90* (2013.01); *H01M 4/9041* (2013.01); *H01M 4/9075* (2013.01); *H01M 4/92* (2013.01); *H01M 12/02* (2013.01); *H01M 12/06* (2013.01); *H01M 12/08* (2013.01); *H01M 12/085* (2013.01); *B82Y 30/00* (2013.01); *B82Y 40/00* (2013.01); *H01M 4/8652* (2013.01); *H01M 4/8657* (2013.01); *H01M 2004/021* (2013.01); *H01M 2300/0014* (2013.01); *H01M 2300/0068* (2013.01); *Y02E 60/10* (2013.01)

(56) References Cited

U.S. PATENT DOCUMENTS

| | | |
|---|---|---|
| 2010/0188801 A1 | 7/2010 | Lyubomirskiy et al. |
| 2011/0027666 A1 | 2/2011 | Burchardt et al. |
| 2014/0295291 A1 | 10/2014 | Kondo et al. |

OTHER PUBLICATIONS

Belser, T. et al., "Cooperative Catalysis in the Hydrolytic Kinetic Resolution of Epoxides by Chiral [(salen)Co(III)] Complexes Immobilized on Gold Colloids," Adv. Synth. Catal. 2008, 350, pp. 967-971.

Martell, A.E. et al., "Metal Complexes in Aqueous Solutions," Plenum: New York (1996), 259 pgs.

Zurilla, R.W., et al., "The Kinetics of the Oxygen Reduction Rection on Gold in Alkaline Solution", Electrochim. Acta (1978) 125, pp. 1103-1109.

Erikson, H. et al., "Electroreduction of oxygen on carbon-supported gold catalysts," Electrochim. Acta (2009), 54, pp. 7483-7489.

Croft, S. et al., "Mechanisms of Peroxide Stabilization. An Investigation of some Reactions of Hydrogen Peroxide in the Presence of Aminophosphonic Acids," J. Chem. Soc. Perkin Trans., (1992) 2, pp. 153-160.

Jiang Chengjun et al., "Synthesis of Chiral (salen) Co Complexes and Their Applications in Hydrolytic Kinetic Resolution", Progress in Chemistry, vol. 20, No. 9, Sep. 2008, 12 pgs.

\* cited by examiner

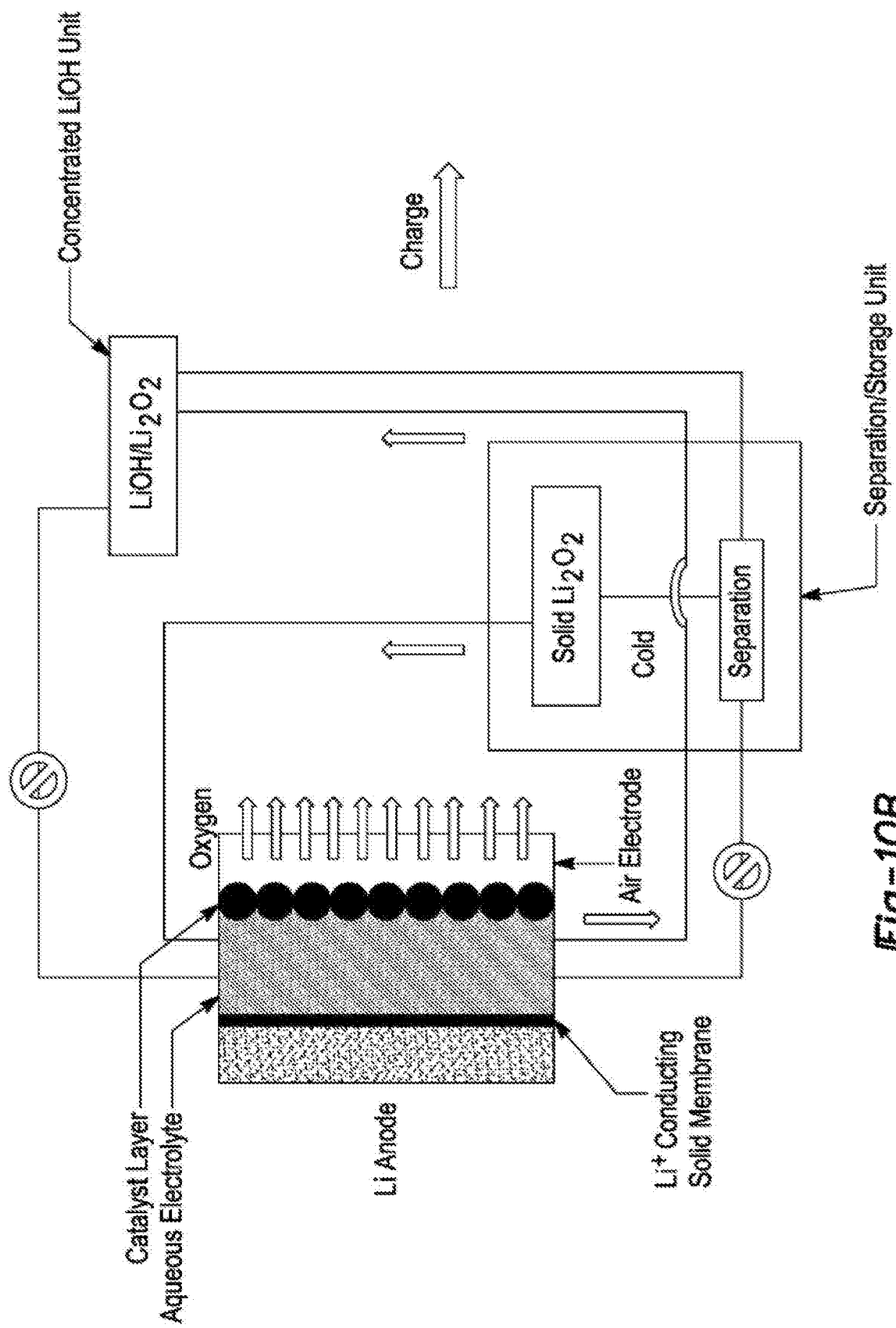

REVERSIBLE BIFUNCTIONAL AIR ELECTRODE CATALYST FOR RECHARGEABLE METAL AIR BATTERY AND REGENERATIVE FUEL CELL

CROSS-REFERENCE TO RELATED APPLICATIONS

This application is a divisional of application Ser. No. 15/033,349, filed Apr. 29, 2016, which is the U.S. National Phase of PCT Application No. PCT/US2014/063724, filed Nov. 3, 2014, which claims the benefit of Provisional Patent Application No. 61/898,532, filed Nov. 1, 2013, the disclosures of which are hereby incorporated by reference herein in their entirety.

GOVERNMENT INTEREST

This invention was made with government support under Grant/Contract Number EPS1004083 awarded by the National Science Foundation. The government has certain rights in the invention.

TECHNICAL FIELD

The presently disclosed subject matter relates to catalysts for two electron, reversible oxygen reduction. The presently disclosed subject matter further relates to air electrodes and electrochemical cells comprising the catalysts, to methods of making the catalysts, and to methods of using the catalysts, for example, to produce hydrogen peroxide.

ABBREVIATIONS

° C.=degrees Celsius
μl=microliters
μm=micrometers
AEM=anion exchange membrane
AgCl=silver chloride
Ah=ampere-hour
AO=anthraquinone oxidation
Au=gold
C carbon
$cm^2$=square centimeter
CV=cyclic voltammetry or cyclic voltammagram
DTPA=diethylenetriaminepentaacetic acid
EDTA=ethylenediaminetetraacetic acid
$H_2O_2$=hydrogen peroxide
IHL=Inner Helmholtz Layer
kg=kilogram
KOH=potassium hydroxide
kWh=kilowatt hour
$Li_2O$=lithium oxide
$Li_2O_2$=lithium peroxide
M=molar
mA=milliampere
mg=milligram
ml=microliters
mM=millimolar
mV/s=millIVolts per second
mAh=milliampere-hour
$O_2$=oxygen
OER=oxygen evolution reaction
OHL=Outer Helmholtz Layer
ORR=oxygen reduction reaction
Pt=platinum
RDE=rotating disk electrode
RHE=reversible hydrogen electrode
rpm=revolutions per minute
RRDE=rotating ring disk electrode
salen=N,N'-ethylenebis(salicylimine)
SHE=standard hydrogen electrode
STEM=scanning transmission electron microscopy
V=volts

BACKGROUND

Developing alternative and renewable energy sources is of interest due to environmental concerns associated with using fossil fuels, as well as the need for energy security. Several different types of renewable energy sources have been developed, including wind power, hydropower, solar power, biomass fuels, geothermal energy, and nuclear power. However, some of these energy sources, such as wind and solar power, are not constant and/or readily transported. Thus, it is often necessary or convenient to transform the energy source into electrical energy for transport and then to store it, e.g., as heat with thermal storage or as chemical energy in batteries or capacitors.

In addition, much effort is being made in the automobile industry to try to replace the combustion engine with clean technology to reduce pollution. Possible replacements include two different types of electrochemical devices, i.e., fuel cells and batteries. Fuel cells can convert chemical energy from an environmentally friendly fuel (e.g., hydrogen) into electricity through electrochemical reaction with oxygen. However, for this approach to be feasible, new methods of fuel production, as well as systems for fuel storage and nation-wide transport would need to be developed and/or built.

Batteries and super capacitors transfer and store electrical energy as chemical energy and electrical field energy. In particular, batteries store electrical energy as chemical oxidation-reduction energy and convert this chemical energy back into electrical energy when in use. Chemical energy can be stored in the active materials of a battery negative electrode. When discharging, electrons travel from the negative to the positive electrode through an external circuit to power the load and complete the discharge reaction at the same time as ions flow directly from the negative side to the positive side through an intervening electrolyte or electrolytes. In rechargeable batteries (also referred to as secondary batteries), the electrons and ions travel in the opposite direction during recharge. Given the existence of established electrical grid systems, the use of batteries (e.g., rechargeable batteries) in the automobile industry could be an attractive option with regard to replacing the combustion engine, assuming that costs, safety, energy density and/or recharging times of these devices can be improved.

Lithium-air batteries are currently the subject of much scientific investigation due to their high theoretical energy density (i.e., of about 12 kWh/kg). When discharging, lithium metal anodes release lithium ions and an electron. The electron goes through an external circuit and lithium ions travel through electrolyte(s) to the cathode. Oxygen combines with the electrons and lithium ions to complete the reaction and produce lithium oxide or lithium peroxide (i.e., $Li_2O$ and $Li_2O_2$). When recharging, lithium oxide or lithium peroxide decomposes to produce oxygen and lithium ions travel back to the anode and are reduced to lithium metal. The oxygen electrode can be porous, e.g., to store the solid products generated from the reaction of Li ions with $O_2$ (i.e., $Li_2O$ and $Li_2O_2$) during the discharge cycle of the battery and typically include a catalyst to promote reactions. Depending upon the type of electrolyte(s), four different types of lithium-air battery have been proposed: aprotic, aqueous, solid state, and mixed aqueous/aprotic. One issue, particularly with aprotic lithium-air batteries is that the overpotential to drive the product back to oxygen and lithium metal is large, usually over 1.5V.

Accordingly, there is an ongoing need for improved electrochemical systems, such as improved metal-air batteries, and for robust bifunctional catalysts (i.e., catalysts that can reduce both the charge overpotential and the discharge overpotential) that can be used in such systems, e.g., to improve efficiency and recharge rates. For instance, e.g., to help increase system efficiency, there is a need for reversible catalysts that can promote both the oxygen reduction reaction (ORR) and the oxygen evolution reaction (OER).

Hydrogen peroxide is an important commodity chemical. Hydrogen peroxide can be used as a bleaching agent (e.g., in the paper industry) and as a cleaning and disinfecting agent. Hydrogen peroxide has also found use in the cosmetic industry and as a propellant. Most hydrogen peroxide is currently produced via an anthraquinone oxidation process, which results in significant chemical waste. Further, since the anthraquinone oxidation process is difficult to carry out on a small scale, production of hydrogen peroxide generally requires transport and storage, which can result in safety concerns. Hydrogen peroxide can also be produced on a smaller scale via direct synthesis from hydrogen and oxygen or electrochemically. These methods would reduce the need for storage and transport by allowing hydrogen peroxide to be produced on site, as needed. The direct synthesis method can involve its own safety concerns (e.g., due to flammability of mixtures of hydrogen and oxygen gases). Recent efforts have been made to improve ORR catalysts for the electrochemical synthesis of hydrogen peroxide; but there is still a need for additional, higher performance ORR catalysts for producing hydrogen peroxide.

SUMMARY

In accordance with some embodiments of the presently disclosed subject matter provided is a catalyst for two electron, reversible oxygen reduction. In some embodiments, the catalyst comprises: (a) gold; and (b) a cobalt coordination complex or polymer thereof. In some embodiment, the cobalt coordination complex comprises a cobalt ion chelated by a tetradentate organic chelating ligand. In some embodiments, the tetradentate organic chelating ligand is N,N'-bis(salicylidene)ethylenediamine or a derivative thereof.

In some embodiments, the cobalt complex is present in a solution that is in contact with the gold. In some embodiments, the cobalt complex is present in a coating covering a surface of a gold structure. In some embodiments, the gold is present in a particle. In some embodiments, the particle is a nanoparticle, optionally wherein the nanoparticle has a diameter ranging from about 1 nm to about 20 nm.

In some embodiments, the cobalt coordination complex has a structure of Formula (I):

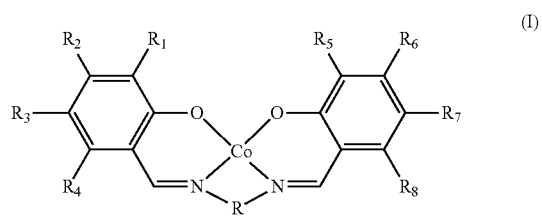

wherein: each of $R_1$, $R_2$, $R_3$, $R_4$, $R_5$, $R_7$, and $R_8$ are independently selected from the group consisting of H, alkyl, cycloalkyl, aralkyl, aryl, heteroaryl, alkoxy, aryloxy, aralkoxy, thioalkyl, thioaralkyl, thioaryl, aminoalkyl, aminoaralkyl, aminoaryl, and a conducting polymer; and R is alkylene or arylene. In some embodiments, one or more of $R_1$, $R_2$, $R_3$, $R_4$, $R_5$, $R_6$, $R_7$, and $R_8$ is a conducting moiety selected from the group consisting of thiophenyl, pyrrolyl, —NHC$_6$H$_6$, —SC$_6$H$_5$; —CH=CH—C$_6$H$_5$; —C≡CH, and a conducting polymer. In some embodiments, one or more of $R_2$, $R_3$, $R_6$, and $R_7$ comprises thiophenyl, optionally wherein both $R_3$ and $R_7$ are thiophenyl. In some embodiments, R is phenylene or optionally substituted ethylene.

In some embodiments, the catalyst comprises a polymer of the cobalt coordination complex, wherein the polymer is formed by bonds between the organic chelating ligands of individual monomer units of the cobalt coordination complex, optionally wherein the polymer is prepared by electropolymerization. In some embodiments, the polymer is present as a film coating covering the surface of a gold-containing structure.

In accordance with some embodiments of the presently disclosed subject matter provided is an air electrode comprising a catalyst as disclosed herein. In accordance with some embodiments of the presently disclosed subject matter provided is an electrochemical cell comprising a catalyst as disclosed herein, optionally wherein the electrochemical cell is a metal-air battery or a fuel cell.

In accordance with some embodiments of the presently disclosed subject matter provided is a method for performing a two electron reduction of oxygen. In some embodiments, the method comprises contacting oxygen with water in the presence of a catalyst as disclosed herein, optionally wherein the reduction is reversible or near-reversible.

In accordance with some embodiments of the presently disclosed subject matter provided is a method for producing hydrogen peroxide. In some embodiments, the method comprises contacting oxygen with an aqueous solution in the presence of a catalyst as disclosed herein to provide hydrogen peroxide.

In accordance with some embodiments of the presently disclosed subject matter provided is a method of preparing a catalyst for two election oxygen reduction. In some embodiments, the method comprises: (a) providing a solution comprising a cobalt coordination complex, optionally wherein the cobalt coordination complex comprises a cobalt ion chelated by a tetradentate organic chelating ligand, optionally wherein the tetradentate organic chelating ligand is N,N'-bis(salicylidene)ethylenediamine or a derivative thereof; (b) providing a structure comprising a gold surface; (c) contacting the structure with the solution from step (a); (d) electropolymerizing the cobalt coordination complex to form an electropolymerized film covering at least a portion of the gold surface.

It is an object of the presently disclosed subject matter to provide catalysts for two electron oxygen reduction (e.g., reversible oxygen reduction), as well as to provide electrodes and electrochemical cells comprising the catalysts, methods of producing the catalysts, and methods of using the catalysts to reduce oxygen and/or provide hydrogen peroxide.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

FIG. 10B is a schematic drawing showing a charge diagram of the lithium air battery of FIG. 10A.

DETAILED DESCRIPTION

Figure 1:
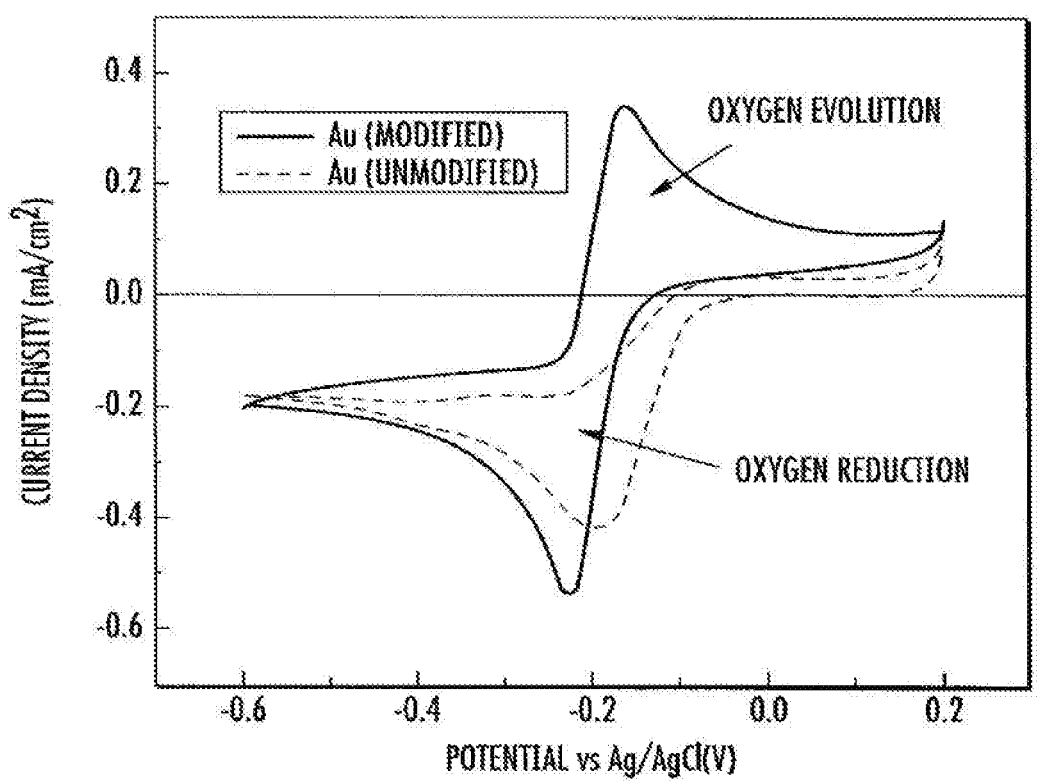
FIG. 1 is a graph showing the cyclic voltammetry (CV) comparison of a normal (unmodified) gold (AU) electrode (dotted line) and a cobalt salen modified gold electrode (solid line) in 1 Molar (1 M) potassium hydroxide (KOH) electrolyte saturated with oxygen gas. The scan rate was 50 milliVolts per second (mV/s). The electrode surface area was 0.19625 square centimeters ($cm^2$). The reference electrode was sliver chloride (AgCl) and the counter electrode was gold wire.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific Journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named Items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

The term "comprising", which is synonymous with "including," "containing," or "characterized by" is Inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of temperature, pH, weight percentage (%), and so forth used in the specification and claims are to be understood as being modified in all Instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, In another example ±5%, in another example ±1%, and in still another example ±0.1% from the specified amount, as such variations are appropriate to perform the disclosed methods.

As used herein the term "alkyl" refers to $C_{1-20}$ Inclusive, linear (i.e., "straight-chain"), branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octaenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms.

Alkyl groups can optionally be substituted (a "substituted alkyl") with one or more alkyl group substituents, which can be the same or different. The term "alkyl group substituent" includes but is not limited to alkyl (saturated or unsaturated), substituted alkyl (e.g., halo-substituted and perhalo-substituted alkyl, such as but not limited to, —$CF_3$), cycloalkyl, halo, nitro, hydroxyl, carbonyl, carboxyl, acyl, alkoxyl, aryloxyl, aralkoxyl, thioalkyl, thioaryl, thioaralkyl, amino (e.g., aminoalkyl, aminodialkyl, aminoaryl, etc.), sulfonyl, and sulfinyl.

The term "aryl" is used herein to refer to an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether. Thus, examples of aryl include, but are not limited to, phenyl, naphthyl, biphenyl, and diphenylether, among others. Aryl groups include heteroaryl groups, wherein the aromatic ring or rings Include a heteroatom (e.g., N, O, S, or Se). Exemplary heteroaryl groups Include, but are not limited to, furanyl, pyridyl, pyrimidinyl, imidazoyl, benzimidazolyl, benzofuranyl, benzothiophenyl, quinolinyl, isoquinolinyl, and thiophenyl.

The aryl group can be optionally substituted (a "substituted aryl") with one or more aryl group substituents, which can be the same or different, wherein "aryl group substituent" includes alkyl (saturated or unsaturated), substituted alkyl (e.g., haloalkyl and perhaloalkyl, such as but not limited to —$CF_3$), cycloalkyl, aryl, substituted aryl, aralkyl, halo, nitro, hydroxyl, acyl, carboxyl, alkoxyl (e.g., methoxy), aryloxyl, aralkyloxyl, thioalkyl, thioaryl, thioaralkyl, amino (e.g., aminoalkyl, aminodialkyl, aminoaryl, etc.), sulfonyl, and sulfinyl.

"Alkylene" refers to a straight or branched bivalent aliphatic hydrocarbon group having from 1 to about 20 carbon atoms, e.g., 1, 2, 3, 4, 5, 6, 7, 8, 9, 10, 11, 12, 13, 14, 15, 16, 17, 18, 19, or 20 carbon atoms. The alkylene group can be straight, branched or cyclic. The alkylene group also can be optionally unsaturated and/or substituted with one or more "alkyl group substituents." There can be optionally Inserted along the alkylene group one or more oxygen, sulfur or substituted or unsubstituted nitrogen atoms (also referred to herein as "alkylaminoalkyl"), wherein the nitrogen substituent is alkyl as previously described. Exemplary alkylene groups include methylene (—$CH_2$—); ethylene (—$CH_2$—$CH_2$—); propylene (—$(CH_2)_3$—); cyclohexylene (—$C_6H_{10}$—); —CH═CH—CH═CH—; —CH═CH—$CH_2$—; —$(CH_2)_q$—N(R)—$(CH_2)_r$—, wherein each of q and r is Independently an integer from 0 to about 20, e.g., 0, 1, 2, 3, 4, 5, 6, 7, 8, 9, 10, 11, 12, 13, 14, 15, 16, 17, 18, 19, or 20, and R is hydrogen or lower alkyl; methylenedioxy (—O—$CH_2$—O—); and ethylenedioxy (—O—$(CH_2)_2$—O—). An alkylene group can have about 2 to about 3 carbon atoms and can further have 6-20 carbons.

The term "arylene" refers to a bivalent aromatic group, e.g., a bivalent phenyl or napthyl group. The arylene group can optionally be substituted with one or more aryl group substituents and/or include one or more heteroatoms.

"Aralkyl" refers to an aryl-alkyl- or an -alkyl-aryl group wherein aryl and alkyl are as previously described, and can include substituted aryl, heteroaryl, and substituted alkyl. Thus, "substituted aralkyl" can refer to an aralkyl group comprising one or more alkyl or aryl group substituents. Exemplary aralkyl groups include benzyl, phenylethyl, and naphthylmethyl.

"Cyclic" and "cycloalkyl" refer to a non-aromatic mono- or multi-cyclic ring system of about 3 to about 10 carbon atoms, e.g., 3, 4, 5, 6, 7, 8, 9, or 10 carbon atoms. The cycloalkyl group can be saturated or partially unsaturated. The cycloalkyl group also can be optionally substituted with an alkyl group substituent as defined herein. There can be optionally inserted along the cyclic alkyl chain one or more oxygen. Representative monocyclic cycloalkyl rings Include cyclopentyl, cyclohexyl, and cycloheptyl. Multicyclic cycloalkyl rings include adamantyl, octahydronaphthyl, decalin, camphane, and noradamantyl.

"Alkoxyl" and "alkoxy" refer to an alkyl-O— group wherein alkyl is as previously described, including substituted alkyl. The term "alkoxyl" as used herein can refer to, for example, methoxyl, ethoxyl, propoxyl, isopropoxyl, butoxyl, t-butoxyl, and pentoxyl. The term "oxyalky" can be used interchangably with "alkoxyl".

"Aryloxyl" and "aryloxy" refer to an aryl-O— group wherein the aryl group is as previously described, including a substituted aryl. The term "aryloxyl" as used herein can refer, for example, to phenyloxyl and to alkyl, substituted alkyl, or alkoxyl substituted phenyloxyl.

"Aralkyloxyl", "aralkoxyl", and "aralkoxy" refer to an aralkyl-O— group wherein the aralkyl group is as previously described. An exemplary aralkyloxyl group is benzyloxyl. "Substituted aralkyoxyl" can refer to an aralkoxyl group wherein the alkyl and/or aryl portion of the aralkyl are substituted by one or more alkyl or aryl group substituents.

The term "vinyl" can refer to the group —CH═$CH_2$, optionally wherein one or more of the hydrogen atoms is replaced by an alkyl group substitutent. Thus, vinyl can refer to substituted or unsubstituted vinyl. "Vinylphenyl" refers to the group —CH═CH-phenyl or —CH═CH—$CH_5$.

The terms "halo", "halide", or "halogen" as used herein refer to fluoro, chloro, bromo, and iodo groups.

The term "amino" refers to the group —$N(R)_2$ wherein each R is independently H, alkyl, substituted alkyl, aryl, substituted aryl, aralkyl, or substituted aralkyl. The terms "aminoalkyl" and "alkylamino" can refer to the group —$N(R)_2$ wherein each R is H, alkyl or substituted alkyl, and wherein at least one R is alkyl or substituted alkyl. "Arylamine" and "aminoaryl" refer to the group —$N(R)_2$ wherein each R is H, aryl, or substituted aryl, and wherein at least one R is aryl or substituted aryl, e.g., aniline (i.e., —$NHC_6H_5$).

The term "thioalkyl" can refer to the group —SR, wherein R is selected from H, alkyl, substituted alkyl, aralkyl, substituted aralkyl, aryl, and substituted aryl. Similarly, the terms "thioaralkyl" and "thioaryl" refer to —SR groups wherein R is aralkyl and aryl, respectively.

A "coordination complex" is a compound in which there is a coordinate bond between a metal ion and an electron pair donor, ligand or chelating group. Thus, ligands or chelating groups are generally electron pair donors, molecules or molecular ions having unshared electron pairs available for donation to a metal ion.

The term "coordinate bond" refers to an interaction between an electron pair donor and a coordination site on a metal ion resulting in an attractive force between the electron pair donor and the metal ion. The use of this term is not intended to be limiting, in so much as certain coordinate bonds also can be classified as have more or less covalent character (if not entirely covalent character) depending on the characteristics of the metal ion and the electron pair donor.

As used herein, the term "ligand" refers generally to a species, such as a molecule or ion, which interacts, e.g., binds, in some way with another species: More particularly, as used herein, "ligand" can refer to a molecule or ion that binds a metal ion in solution to form a "coordination complex." See Martell, A. E., and Hancock, R. D., *Metal Complexes in Aqueous Solutions*, Plenum: New York (1996), which is incorporated herein by reference in its entirety. The terms "ligand" and "chelating group" can be used interchangeably. Organic ligands can have two or more groups with unshared electron pairs separated by, for example, an alkylene or arylene group. Groups with unshared electron pairs, include, but are not limited to, —$CO_2H$, —$NO_2$, —$B(OH)_2$, —$SO_3H$, $PO_3H$, phosphonate, and heteroatoms (e.g., nitrogen) in heterocycles.

"Tetradentate" as used herein refers to a chelating ligand that forms four coordinate bonds with a metal ion.

"Bifunctional" as used herein refers to a catalyst that can catalyze both oxygen reduction reactions and oxygen evolution reactions and/or that can reduce both the charge overpotential and the discharge overpotential.

As used herein, the term "reversible" can refer to both chemical and electrochemical reversibility. For a chemically reversible catalyst of the presently disclosed subject matter, the oxidation peak current density is equal to the reduction peak current density (i.e., the ratio of peak reduction current density/peak oxidation current density is 1) and all of the oxygen that is reduced can be oxidized back. Electrochemical reversibility can refer to the rate at which electron transfer occurs between a working electrode and redox species in solution, particularly that the electron transfer should occur quickly. A large rate constant for electron transfer (e.g., a rate constant, $k_s$, of greater than about 0.020 cm/s) can be indicative of electrochemical reversibility.

Figure 14:
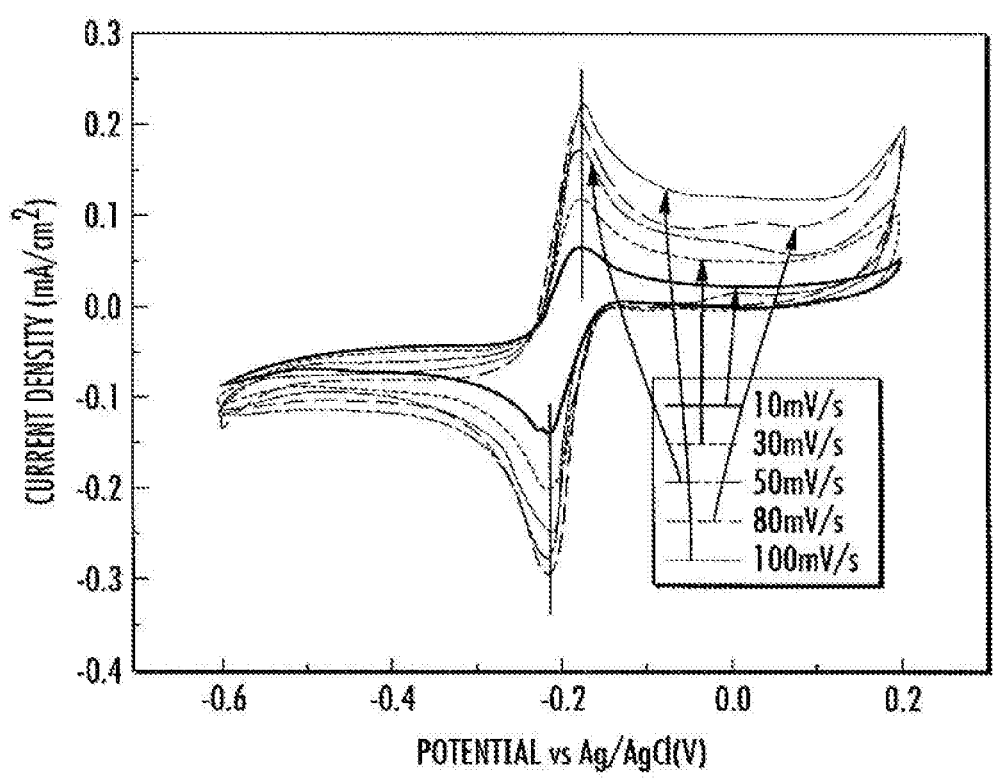
FIG. 14 is a graph showing CVs of various scan rates on Au (poly) electrode in a reduced scan range particular for oxygen reduction redox peaks. Electrolyte: 1 M KOH+1 mM cobalt salen, IR corrected.

The term "near-reversible" refers to a catalyst of the presently disclosed subject matter that is close to being reversible, either chemically, electrochemically or both. With regard to chemical reversibility, the ratio of peak reduction current density/peak oxidation current density is between about 1.001 and about 1.11 and/or about 90% or more (e.g., 90, 95, 96, 97, 98, or 99% or more of the oxygen that is reduced can be oxidized back. With regard to electrochemical reversibility, the rate constant $k_s$ can be between about 0.20 cm/s and about 0.00005 cm/s. Also, the shape of the CV can indicate a highly reversible case. Referring to FIG. 14, the peak separation is about 36 mV, this should be most probably a two electron redox reaction. Secondly, in the example of a two electron redox process, the separation peak potential difference, 36 mV≈58 mV/2 shows this is a nearly reversible case. Continuing with FIG. 14, the oxidation peak current is slightly smaller than the reduction peak current, the ratio of peak reduction current density over peak oxidation current density is 1:0.81. This also proves that this is a quasi-reversible case and the cathodic reduction product has a EC mechanism.

Continuing with FIG. 14, variation of scan rate is a basic but very useful method in CV. By changing the scan rate, the experiment is altering the balance between the speed of electron transfer and reactant transport. The difference between a reversible redox process and a quasi-reversible redox process can be shown in the speed of hetergeneous electron transfer. For the reversible case, no matter what the scan rate is, the hetergeneous electron transfer rate is fast enough to reach equilibrium. Thus, the CV's peak potential will not change along with the scan rate change, which is one standard to verify whether the redox couple is electrochemical reversible or not. From FIG. 14, we can see that the peak potential separation almost does not shift with one order of magnitude increase on scan rate. This is reversible case according to this standard.

The term "electrochemical cell" refers to system that can generate electricity from chemical reactions or that can facilitate a chemical reaction using electrical energy. In some embodiments of the presently disclosed subject matter, electrochemical cells can include at least two electrodes and an electrolyte. Exemplary electrochemical cells include, but are not limited to, metal air cells (e.g., metal air batteries), such as zinc air cells, aluminum air cells, magnesium air cells, sugar air cells, and the like, that use air electrodes (i.e., oxygen-reducing electrodes); fuel cells (e.g., oxygen hydrogen fuel cells, direct methanol fuel cells and the like), electrolysers (e.g., peroxide producing electrolysers), and electrochemical sensors (e.g., enzyme sensors, oxygen sensors, protein sensors, etc.).

The term "electrolyte" refers to a material that can conduct ions. Typically, electrolytes are liquids or solids (e.g., gels, polymers, or ceramics). Liquid electrolytes can be aqueous or based on an organic solvent and can further include one or more ion conducting salts.

The term "battery" refers to device that comprises one or more electrochemical cell or cells that can convert stored chemical energy into electrical energy. The term "primary battery" refers to a disposable, single use battery wherein the electrode materials are irreversible changed during discharge; while the term "secondary battery" refers to a battery that can discharge and be recharged multiple times and wherein the original electrode materials can be restored by during recharge.

II. General Considerations

Metal air batteries have been known for over a century, but have recently garnered attention in view of demands for new high energy density batteries. Metal air batteries, which utilize oxygen as a positive electrode active material, can combine high energy density with reduced size and weight. Examples of metal air batteries include, for example, lithium air batteries, magnesium air batteries, and zinc air batteries.

Metal air batteries can charge/discharge by performing a redox reaction of oxygen in an air electrode (which can be, for example, a gas diffusion electrode (GDE)) and a redox reaction of a metal contained in a metal electrode. Thus, metal air batteries can include an air electrode, which can include an air electrode current collector that collects a current of the air electrode; a negative electrode that contains a negative electrode active material (i.e., a metal or metal alloy) and which can contain a negative electrode current collector that collects a current of the negative electrode; and one or more electrolytes provided between the air electrode and the negative electrode. Unlike other batteries, the positive electrode active material is not stored in the battery. Rather, when the battery is exposed to the environment, oxygen can enter the battery, e.g., through an oxygen diffusion membrane and a porous air electrode. Typically, a catalyst is associated with the air electrode to catalyze reduction of the oxygen, e.g., at a surface of the air electrode.

The most extensively developed kinds of air electrode for rechargeable batteries to date include conventional aqueous air electrodes and aprotic air electrodes. The conventional aqueous air electrode is based on four electron irreversible oxygen reduction reaction (ORR) chemistry:

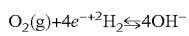

A regenerative fuel cell using this air electrode chemistry can have a cell discharge voltage and charge voltage as below:

Cell discharge voltage: 0.9V Cell recharge voltage: 1.43V Conventional aqueous air electrodes are mainly studied and used in zinc air batteries and in regenerative fuel cell systems. A challenge for this type of rechargeable air electrode is the large voltage gap between charging and discharging because of the irreversible nature of the chemistry, making it difficult to find a bifunctional catalyst that can reduce the voltage gap while still remaining stable and inexpensive. While some improvements have been achieved, the system efficiency is still around 50% to 65% at reasonable charge and discharge rates.

Aprotic air electrodes can provide a wide electrochemical window and keep battery structure simple. However, the lithium peroxide or lithium superoxide (LiO$_2$) generated during oxygen reduction is very reactive toward electrolyte and binder materials, and many side reactions can happen along with the intended air electrode chemistry. Furthermore, oxygen containing discharge products are electron and lithium ion insulating. Thus, high current density discharge can cause clogging problems and damage porous support structures. Accordingly, the further use of this kind of air battery will likely focus on low power density and long term energy storage applications. In addition, proved reversible air electrode chemistry in non-aqueous electrolyte has previously been exclusively one electron reaction with superoxide as a discharge product, which does not release the full potential of the air electrode.

In accordance with some embodiments, the presently disclosed catalysts can catalyze reversible two electron ORR:

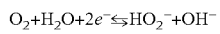

$$O_2 + H_2O + 2e^- \leftrightarrows HO_2^- + OH^-$$

A regenerative fuel cell based on this air electrode chemistry can have charge and discharge cell voltage as below:

involve hazards and further expense. Therefore, a direct onsite synthesis method for hydrogen peroxide is desirable.

Direct synthesis of $H_2O_2$ from $H_2$ and $O_2$ has been studied for a century since the first patent application filed by Henkel and Weber in 1914. However, little progress has been made because of safety issues ($H_2$-$O_2$ mixture are flammable over the range of 4-94% $H_2$ by volume). The explosion hazards can be avoided by diluting $H_2/O_2$ feed streams away from the explosion limits or by using membrane-based reactors to separate the two gases; but both of those methods have a low reaction rate and are not practical for commercial purposes. On the other hand, having $O_2$ and $H_2$ react efficiently with a separator in the middle has been further developed by recent research in fuel cells. The electrochemical direct synthesis method has many advantages over a normal chemical direct synthesis method. A comparison of the AO process, direct synthesis and electrochemical direct synthesis is shown in Table 1.

TABLE 1

Comparison between AO process, chemical direct synthesis and electrochemical direct synthesis.

| PROCESS | Indirect synthesis AO process | Direct synthesis | Electrochemical Direct synthesis |
|---|---|---|---|
| PRINCIPLE | Sequential Hydrogenation and oxidation of organic mole | $H_2 + O_2 = H_2O_2$ + heat | $H_2 + O_2 = H_2O_2$ + heat + electricity or electricity + $H_2O$ + $O_2 = H_2O_2$ |
| GENERAL FEATURE | Mature, well known, large scale | Simple, small scale, low | Simple, small scale |
| CATALYST | Pd in hydrogenation step | Pd- and Au- based catalyst | Mostly carbon |
| REACTION RATE | Slow, several steps | Slow | Fast (With presently Disclosed catalyst) |
| REACTOR SYSTEM | A complex system with numerous reactors | Single reactor | Single reactor |
| ABILITY TO USE AIR | Capable | Not capable | Capable |
| SELECTIVITY | High | Is an issue | High (With presently disclosed catalyst) |
| SAFETY | Safe | Is an issue | Safe |
| ON SITE PRODUCTION | Impossible | Possible | Possible |

Cell discharge voltage: 0.83V Cell charge voltage: 0.83V By "reversible" is meant both chemically and electrochemically reversible. Thus, the system voltage efficiency can reach a high ratio. Further, the catalyst has a high kinetic performance separately on two electron ORR and two electron OER. Moreover, producing peroxide in aqueous solution can provide various air battery features not previously possible. Since the peroxide is produced into aqueous solution, it can be possible to separate the energy density and power density.

Hydrogen peroxide ($H_2O_2$) is an important commodity chemical. Demand for hydrogen peroxide has grown significantly due to its "green" character. However, at present, hydrogen peroxide is mainly produced on an industrial scale by the anthraquinone oxidation (AO) process, which is not considered a green method. The AO process involves the sequential hydrogenation and oxidation of an alkylanthraquinone precursor dissolved in a mixture of organic solvents. The process generates significant chemical waste and is difficult to carry out in small scale. In addition, the transport, storage, and handling of bulk hydrogen peroxide Depending upon which chemistry is operated in the other electrode (i.e., the non-air electrode), electrochemical direct synthesis can have two modes on producing hydrogen peroxide: fuel cell mode and electrolytic mode. Fuel cell direct synthesis can be seen as a premium version of a membrane based chemical reactor. Not only are the two reactants separated by the electrolyte, but the mass transfer within the electrolyte can also be faster than a simple membrane reactor. This is because the reactant transport is not limited by gas diffusion through the membrane to finish the reaction. For a fuel cell system, part of the chemical reaction also generates electricity by a direct conversion process, which is more efficient than through a thermal process. The GDE developed along with fuel cell research also provides for the use oxygen in air from the atmosphere, which is hard to achieve in normal chemical direct synthesis. Therefore, fuel cell direct synthesis can be a good method for onsite hydrogen peroxide production.

Another electrochemical hydrogen peroxide direct synthesis method involves the use of an oxygen evolution reaction electrode to replace the hydrogen electrode of a fuel cell and to operate the cell in an electrolytic mode. This can be beneficial in locations where using electricity is more cost-effective than using hydrogen. Both fuel cell and electrolytic direct synthesis benefit from using advanced catalyst-based air electrodes to generate hydrogen peroxide.

There has already been some effort from both industry and academic research on electrochemical hydrogen peroxide onsite production. For instance, processes have been described which employ cathodes fabricated from a bed of reticulated vitreous carbon covered by carbon powder/PTFE composite or GDEs. These efforts have made strides in solving the problem of low solubility of oxygen in aqueous solutions fed into the cell. However, commercialization attempts have failed because the hydrogen peroxide produced in these methods is relatively higher in price than hydrogen peroxide produced by other methods due to the use of low performance catalysts. Electrochemical systems based on low performance catalysts will have low system efficiency. For a peroxide producing fuel cell system, this means much less electrical energy can be produced with same amount of reactant since more energy is lost in overpotential to drive the kinetics, which will increase the cost of hydrogen peroxide. For an electrolytic cell, this means more electricity is needed to produce hydrogen peroxide. Also, for both production methods, a much larger cell is needed for the same hydrogen peroxide production rate. This is because the less efficient operating point also leads to a relatively low operating current density, which in turn results in a higher hardware cost per unit hydrogen peroxide produced.

A catalyst with better kinetic performance and high selectivity for two electron oxygen reduction would be advantageous in further developing both metal-air batteries and fuel cell direct synthesis processes for producing hydrogen peroxide. However, in general, known electrocatalysis of ORR so far either involves fairly high kinetic performance with four-electron oxygen reduction or relatively poor kinetic performance with a two-electron oxygen reduction. Although some effort has been expended to explore advanced catalysts, carbon still remains as the most used catalyst. Carbon, well known as a catalyst support in many different kinds of electrochemical systems, has very low electrochemical kinetic performance for two electron ORR to produce hydrogen peroxide. Other catalysts with slightly improved performance have not been able to overcome the advantage of carbon on cost.

The presently disclosed subject matter is based at least in part on the finding of a new catalyst for two electron ORR that comprises gold (Au) and cobalt salen (or a derivative and/or polymer thereof). As described in the examples, catalysts made of Au and cobalt salen can promote oxygen reduction with higher kinetics and onset potential than carbon, while still retaining over 90% selectivity for two electron oxygen reduction over a wide potential range. See, for example, FIGS. 6 and 7A. Preliminary peroxide production experiments with a simple electrochemical cell structure show that the presently disclosed catalyst has two times higher current under the same experimental condition than a normal carbon/PTFE composite catalyst without losing any current efficiency. This means that nearly two times as much hydrogen peroxide is generated with the presently disclosed catalysts at the same voltage and experimental conditions. Furthermore, not only is a large improvement over carbon on two electron ORR observed, but, as shown in FIG. 7B, the kinetic performance of the presently disclosed catalyst is also comparable with Pt, which is the most commonly used ORR catalyst in high performance fuel cell systems.

Figure 8A:
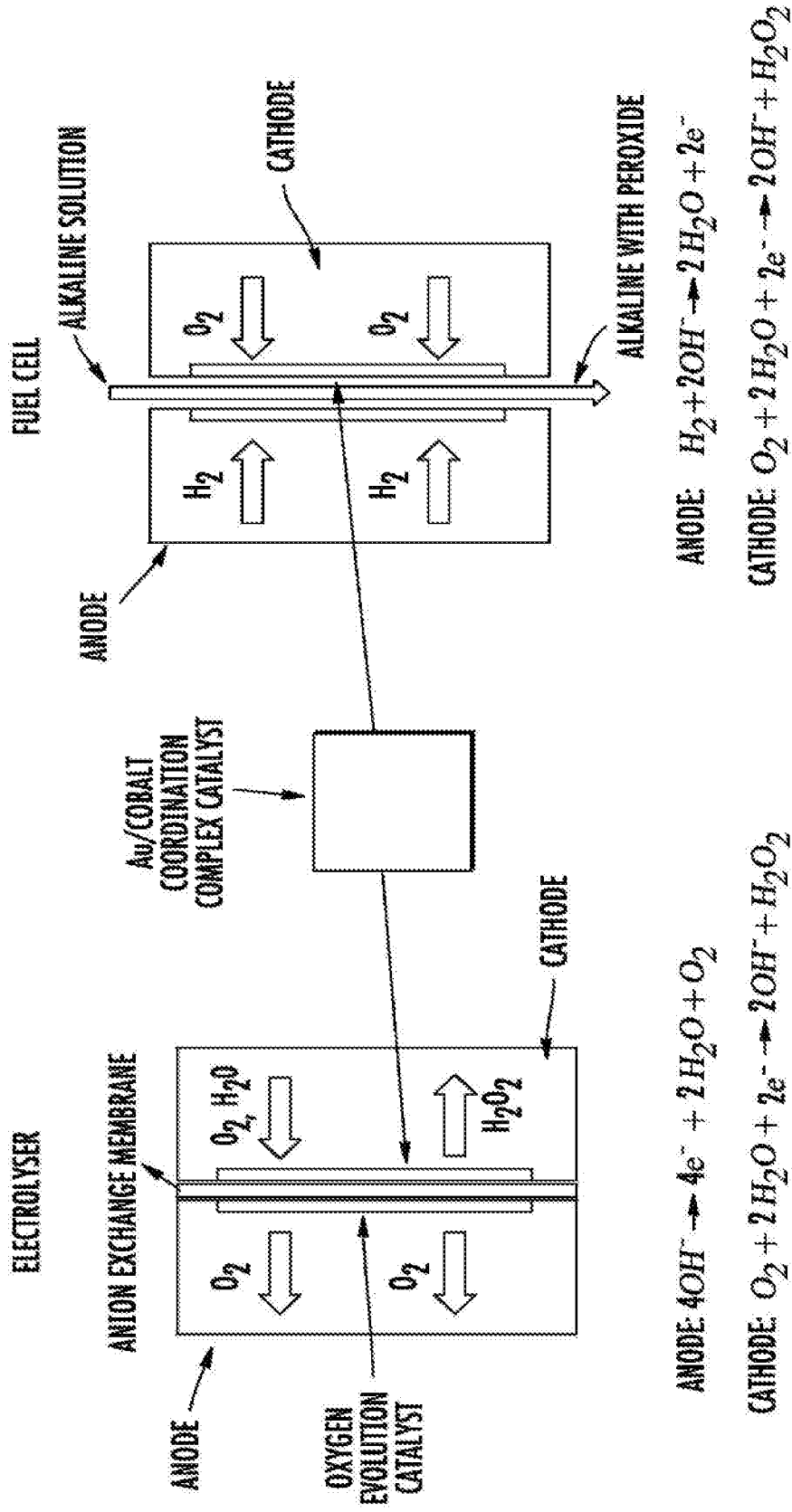
FIG. 8A is a schematic drawing showing electrolytic cells for hydrogen peroxide ($H_2O_2$) production according to an embodiment of the presently disclosed subject matter. The cell on the left-hand side is an electrolyser that includes an anode (comprising a nickel mesh oxygen evolution catalyst), an anion exchange membrane, and an air electrode (cathode) that comprises a gas diffusion electrode that comprises a catalyst of the presently disclosed subject matter. Hydrogen peroxide can be removed via the cathode. The cell on the right-hand side is a fuel cell that comprises a hydrogen source associated with an anode and a cathode comprises a gas diffusion electrode that comprises a catalyst of the presently disclosed subject matter. An aqueous alkaline electrolyte flows through the cell removing hydrogen peroxide, which can be dissolved in the electrolyte.

The importance of a high performance catalyst is not only about the catalyst itself, but also provides for the use of high performance fuel cell flow field design. From recent fuel cell research, flow field design for high current density fuel cells has been significantly advanced. However, this knowledge is not as useful if the peroxide producing fuel cell/electrolyser is built based on a low performance carbon ORR catalyst. Based on the presently disclosed high performance two electron ORR catalysts, existing knowledge on flow field design can be adapted to build a better high performance and highly efficient fuel cell/electrolyser to produce hydrogen peroxide. As described further hereinbelow, using an electrolytic cell as shown in FIG. 8A, the peroxide producing current efficiency of the presently disclosed catalysts can be over 90% in a wide potential range.

III. Two Electron, Reversible ORR Catalysts

Accordingly, in some embodiments, the presently disclosed subject matter provides a catalyst for two electron oxygen reduction. The catalyst can be reversible or near-reversible. The catalyst comprises a cobalt coordination complex and gold. The cobalt coordination complex comprises a cobalt ion chelated by an organic chelating ligand, e.g., an organic tetradentate chelating ligand, or a polymer thereof.

In some embodiments, the organic chelating ligand is N,N'-bis(salicylidene)ethylenediamine or a derivative or polymer thereof. Thus, in some embodiments, the cobalt coordination complex is N,N'-Bis(salicylidene)ethylenediaminocobalt (II) (i.e., cobalt salen, which is also sometimes referred to as ethylenebis(salicylimine) cobalt(II))

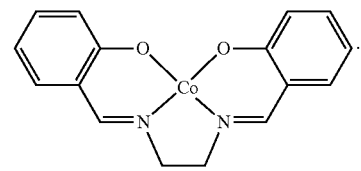

In some embodiments, cobalt coordination complex can comprise derivatives of N,N'-bis(salicylidene)ethylenediamine. In some embodiments, the cobalt coordination complex has a structure of Formula (I):

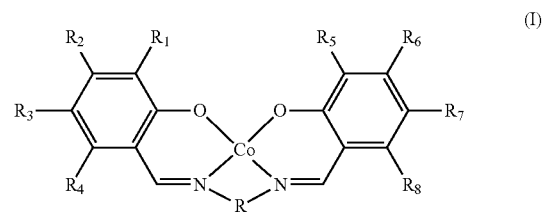

wherein:
each of $R_1$, $R_2$, $R_3$, $R_4$, $R_5$, $R_6$, $R_7$, and $R_8$ are independently selected from the group comprising H, alkyl, cycloalkyl, aralkyl, aryl, heteroaryl, alkoxy, aryloxy, aralkoxy, thioalkyl, thioaralkyl, thioaryl, aminoalkyl, aminoaralkyl, aminoaryl, and a conducting polymer; and
R is an alkylene or arylene group.

In some embodiments, one of $R_1$-$R_8$ is a conducting moiety, such as a conducting polymer (i.e., a monovalent group formed from a conducting polymer or oligomer). A variety of conducting polymers are known in the art, including but not limited to, polyacetylene, polyphenylene vinylene, polypyrrole, polythiophene (e.g., poly(3,4-ethylenedioxythiophene) (PEDOT)), polyaniline, and polyphenylene sulfide. Suitable conducting moieties can also be selected from groups based on the monomers of these polymers, such as thiophenyl (i.e., a monovalent substituent derived from thiophene), pyrrolyl, —$NHC_6H_5$, —$SC_6H_5$; —CH=CH—$C_6H_5$; and —C≡CH. In some embodiments, the conducting moiety or conducting polymer can also be substituted on the alkylene or arylene R group of the coordination complex. In some embodiments, one or more of $R_2$, $R_3$, $R_6$, and $R_7$ or one or both of $R_3$ and $R_7$ is/are a conducting moiety or polymer.

In some embodiments, one or more of $R_1$-$R_8$ is alkoxy, alkoxy-substituted phenyl, thiophenyl, or benzothiophenyl. For example, one or more of $R_1$-$R_8$ can be: methoxy,

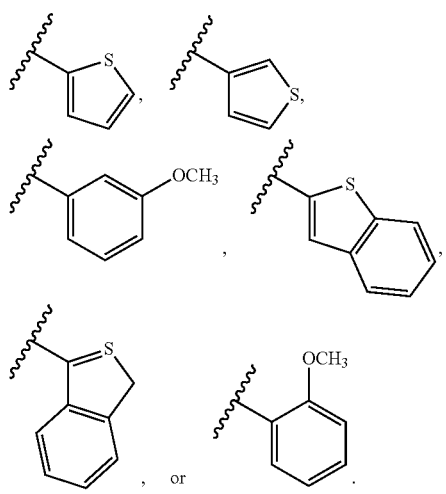

In some embodiments, the coordination complex is a thiophene modified cobalt salen wherein one or more of $R_{1-8}$ is thiophenyl. In some embodiments, one or more of $R_2$, $R_3$, $R_6$, and $R_7$ is thiophenyl. In some embodiments, $R_3$ and $R_7$ are thiophenyl. Thus, in some embodiments, the cobalt coordination complex is a thiophene modified cobalt salen having the structure:

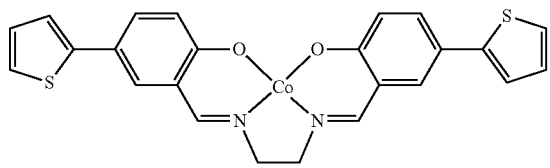

The R group alkylene or arylene group can be optionally substituted and/or include one or more heteroatoms (e.g., be heteroarylene). In some embodiments, R is alkylene optionally having one or more oxygen atoms inserted in the carbon chain (e.g., R can include one or more —O—$CH_2CH_2$—O— units), heteroarylene (e.g., a divalent pyridyl or triazolyl group), phenylene, or cyclic alkylene (e.g., divalent cyclohexyl). In some embodiments, R is ethylene or optionally substituted ethylene, e.g., the group -CH($R_9$)CH($R_{10}$)—, wherein $R_9$ and $R_{10}$ are independently selected from H, alkyl cycloalkyl, aralkyl, heteroaryl, aryl, alkoxy, aralkoxy, ary- loxy, thioalkyl, thioaryl, thioaralkyl, aminoalkyl, aminoaralkyl, and aminoaryl, or wherein $R_9$ and $R_{10}$ together form an alkylene or arylene group. Thus, in some embodiments, the cobalt coordination complex has one of the structures:

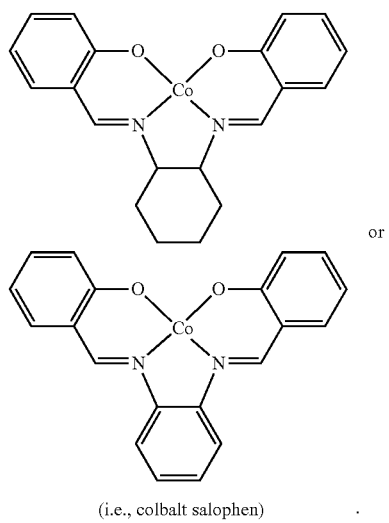

(i.e., colbalt salophen)

In some embodiments, the cobalt coordination complex can be a polymer, e.g., a polymer containing a plurality of monomer units, each based upon a cobalt coordination complex, wherein covalent bonds (e.g., sigma bonds) have been formed between atoms (e.g., carbon atoms) in the chelating ligand of one coordination complex monomer unit and atoms (e.g., carbon atoms) in the chelating ligand of additional monomer units. In some embodiments, the polymer is provided by electropolymerizing a solution of a cobalt coordination complex (e.g., cobalt salen or a derivative thereof).

Any suitable gold-containing structure can be used, so long as at least a portion of the surface of the structure comprises gold. Thus, the gold can be gold in bulk form, e.g., microporous gold or any bulk gold. The gold can be polycrystalline or have a single or dominant crystallographic orientation (i.e., Au(100) or Au(111)). The gold can be a gold layer or film present on a surface (e.g., of an air or other electrode). For instance, the gold can be coated (e.g., via sputtering or any other suitable technique) onto a support material comprising another element or elements. In some embodiments, the support material is carbon or another material that is present, for example, on a surface of an air electrode and/or in a fuel cell. Suitable carbon support materials include, but are not limited to, synthetic graphite, natural graphite, amorphous carbon, hard carbon, soft carbon, acetylene black, mesocarbon microbeads, carbon black, Ketjen black, mesoporous carbon, porous carbon matrix, carbon nanotubes, carbon nanofibers, carbon papers, carbon cloths, and graphene.

The gold can be present as particles, which can optionally include a support material in addition to the gold, so long as the particle comprises a gold surface, and which can have any suitable shape or shapes, including, but not limited to, spherical, disk-shaped, cone-shaped, cylindrical, pyramidal, prism-shaped, cube, cuboid, and the like. The particles can be regular or irregular. In some embodiments, the particles are micro- or nanoparticles. In some embodiments, the nanoparticles have an average diameter that is about 100 nm or less, about 50 nm or less, or about 20 nm or less (e.g., about 1, 2, 3, 4, 5, 6, 7, 8, 9, 10, 11, 12, 13, 14, 15, 16, 17, 18, 19, or about 20 nm).

In some embodiments, the gold nanoparticles have a gold surface and further comprise a support material, such as a carbon support material. The carbon support material can be, but is not limited to, carbon black, or one of the other carbon materials typically used in air electrodes. In some embodiments, the gold nanoparticles comprise between about 1 weight % and about 30 weight % gold (e.g., about 1, 2, 4, 6, 8, 10, 12, 14, 16, 18, 20, 22, 24, 26, 28, and about 30 weight % gold).

The cobalt complex can be present in a solution (e.g., an electrolyte solution) that is in contact with the gold or be present as a solid, e.g., immobilized non-covalently on a gold surface. In some embodiments, the cobalt complex is present as a thin film produced by drying a solution of the cobalt complex on a gold surface. In some embodiments, the cobalt complex is polymerized (e.g., electropolymerized) on a gold surface.

In some embodiments, the catalyst composition comprises a weight ratio of gold to cobalt coordination complex of between about 2:1 to about 1:30. In some embodiments, the weight ratio of gold to cobalt coordination complex is between about 1:5 and about 1:15 (e.g., 1:5, 1:6, 1:7, 1:8, 1:9, 1:10, 1:11, 1:12, 1:13, 1:14, and 1:15). In some embodiments, the weight ratio of gold to cobalt coordination complex is about 1:10.

In some embodiments, the presently disclosed subject matter provides a method of preparing a catalyst for reversible, two electron oxygen reduction, wherein the method comprises:

(a) providing a solution comprising a cobalt coordination complex, wherein the cobalt coordination complex comprises a cobalt ion chelated by a tetradentate organic chelating ligand;

(b) providing a structure comprising a gold surface; and (c) contacting the structure with the solution from step (a).

In some embodiments, the tetradentate organic chelating ligand is N,N'-bis(salicylidene)ethylenediamine or a derivative thereof.

In some embodiments of the above-mentioned methods, the method further comprises: (d) electropolymerizing the cobalt coordination complex to form an electropolymerized film on the surface of the structure (i.e., over a portion of the gold surface). Alternatively, following step (c), the solution of step (a) can be dried to form a film of non-polymerized coordination complex.

In some embodiments, the solution comprising the cobalt coordination complex is prepared using an organic solvent, such as, but not limited to, acetonitrile (ACN), dimethyl sulfoxide (DMSO), dimethyl formamide (DMF), N-methyl 2-pyrrolidone (NMP), and dimethyoxyethane (DME) or another aprotic solvent. In some embodiments, the solution further comprises a salt, such as, but not limited to, tetrabutylammonium bromide (TBAB) or tetrabutylammonium tetrafluoroborate.

In some embodiments, the cobalt coordination complex can be any complex having a structure of Formula (I) as described hereinabove or a polymer thereof. In some embodiments, the cobalt coordination complex is selected from cobalt salen, cobalt salophen, and a thiophene modified cobalt salen. In some embodiments, the structure comprising a gold surface is a nanoparticle, e.g., a gold nanoparticle or a gold/carbon nanoparticle. In some embodiments, the structure is an electrode, such as an air electrode, wherein the gold is present as a layer or coating on a surface of the air electrode.

IV. Electrochemical Cells, Cell Components, and Systems

In some embodiments, the presently disclosed subject matter provides a component of an electrochemical cell that comprises a catalyst comprising gold and a cobalt coordination complex (e.g., cobalt salen or a derivative and/or polymer thereof). For example, the cell component can be an electrolyte comprising the catalyst, an electrode (e.g., a gold or an air electrode) comprising the catalyst, or a support, such as a membrane or particulate structure that comprises the catalyst and can be inserted into an electrolyte solution or layered onto a surface of an electrode.

In some embodiments, the presently subject matter provides an air electrode that comprises the catalyst. Any suitable air electrode can be provided and coated with a layer or layers comprising the catalyst. Air electrodes can include a carbon material (e.g., a porous carbon material) having a surface. In some embodiments, the surface can be coated with a thin layer of an inert material. The layer can be continuous or discontinuous. In some embodiments, the inert material layer can have a thickness of between about 0.1 nm and about 100 nm. In some embodiments, a layer of a porous material (e.g., a carbon paper or carbon cloth) can be added on the surface (e.g., of the inert material or of the other carbon materials of the air electrode) as a gas diffusion layer.

A thin layer of a metal or of metal containing nanoparticles (e.g., metal oxide or metal/carbon nanoparticles) can be added as an overcoating to any or all of the other above-described surface layers. For instance, the metal or metal containing nanoparticles can include the gold component of the presently disclosed catalyst. The nanoparticles, if present, can have an average particle size of between about 1 and about 100 nm (or between about 1 nm and about 50 nm, or between about 1 nm and about 20 nm). The metal or metal nanoparticles can then be coated with a film and/or polymer of the cobalt coordination complex.

The carbon material can be any carbon material known for use in air electrodes. Such materials include, but are not limited to, synthetic graphite, natural graphite, amorphous carbon, hard carbon, soft carbon, acetylene black, mesocarbon microbeads, carbon black, Ketjen black, mesoporous carbon, porous carbon matrix, carbon nanotubes, carbon nanofibers, and graphene. By "inert material" is meant a material that is stable in an oxygen containing atmosphere (i.e., the material does not react with oxygen under ambient conditions). The material is also stable to any electrolyte to which the air electrode will be exposed. Suitable inert materials include, but are not limited to metal oxides, metal halides, metal oxyfluoride, metal phosphate, metal sulfate, non-metal oxides, and non-metal elements (e.g., silicon).

The air electrodes can include multiple thin layers of carbon material. They can also include binders to hold that carbon material together or to maintain contact of the carbon material to a current collector that can be provided as part of the air electrode. Suitable binders include, but are not limited to, poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, or a copolymer or blend of any of these materials.

The coated carbon materials can be prepared by a variety of deposition methods known for the deposition of thin layers and/or for catalysts for air electrodes. Such methods include, but are not limited to, atomic layer deposition (ALD), sputtering, ink-jet, spray, co-precipitation, chemical vapor deposition (CVD), physical vapor deposition (PVD), or electron beam deposition (EBD). In some embodiments, a film of the cobalt coordination complex is provided over a layer of gold or gold-containing nanoparticles via electropolymerization.

In some embodiments, the air electrode can be provided with an air electrode current collector for collecting the current of the air electrode. In some embodiments, the air electrode current collector can have a porous structure or a dense structure as long as it has suitable electron conductivity. In some embodiments, in view of the desired diffusion of air (oxygen), a porous structure can be used. Examples of porous structures include, for instance, mesh structures where structural fibers are regularly arranged, a nonwoven fabric structure where the structural fibers are arranged at random, and a three-dimensional network structure having independent pores or connected pores. Examples of materials for the air electrode current collector include, but are not limited to, metals, such as stainless steel, nickel, aluminum, iron, titanium, and copper; carbon materials, such as carbon fiber, carbon cloth, and carbon paper; and ceramic materials having high electron conductivity, such as titanium nitride. In some embodiments, the thickness of the current collector can be between about 10 and about 1000 microns. In some embodiments, the air electrode can be included in a battery and the battery case can serve as the air electrode current collector.

In some embodiments, the presently disclosed subject matter provides an electrochemical cell that comprises a catalyst comprising gold and a cobalt coordination complex (e.g., cobalt salen or a derivative and/or polymer thereof). In some embodiments, the presently disclosed subject matter provides a fuel cell or a battery (e.g., a metal-air battery) comprising the catalyst.

In some embodiments, the presently disclosed subject matter provides an air battery comprising a negative electrode (e.g., a metal electrode, such as a lithium or zinc electrode), an air electrode, and at least one electrolyte disposed between the electrodes. In some embodiments, the air electrode can be an air electrode as described hereinabove. Any suitable electrolyte or combination of electrolytes can be used. For example, the electrolyte(s) can be aprotic (i.e., organic), aqueous, and/or solid-state (e.g., gel or polymer). In some embodiments, the battery can include at least an aqueous electrolyte that is in contact with the air electrode. In some embodiments, the solid-state electrolyte has a thickness of between about 0.1 and about 10 µm, and in some embodiments, between about 3 and about 5 µm.

The negative electrode can include a negative electrode active material capable of releasing and storing metal ions (conducting ions). The negative electrode can be provided with a negative electrode current collector that collects a current of the negative electrode. The negative electrode active material is not particularly limited as long as it can release and store conducting ion species (e.g., metal ions). For example, in some embodiments, the negative electrode can be a metal electrode comprising a material selected from the group including, but not limited to, a metal, a metal alloy, a metal oxide, a metal sulfide and a metal nitride, which contain a metal ion that is a conducting ion species. In some embodiments, a carbon material can be used as a negative electrode active material. In some embodiments, a metal or metal alloy is used as the negative electrode active material. Suitable metals include, but are not limited to, lithium (Li), sodium (Na), potassium (K), magnesium (Mg), calcium (Ca), aluminum (Al), zinc (Zn) and iron (Fe). In some embodiments, the negative electrode is a lithium or zinc electrode. More particularly, as a negative electrode active material of a lithium-air battery, for example, lithium metal; lithium alloys such as lithium aluminum alloy, lithium tin alloy, lithium lead alloy, and lithium silicon alloy; lithium oxide; lithium composite oxides such as lithium titanate; lithium sulfides such as lithium tin sulfide and lithium titanium sulfide; lithium nitrides such as lithium cobalt nitride, lithium iron nitride and lithium manganese nitride can be employed.

The negative electrode can contain at least a negative electrode active material. In some embodiments, it can also contain a binder for fixing the negative electrode active material. For example, when a foil-like metal or alloy is used as a negative electrode active material, a negative electrode can be formed into a form having the negative electrode active material alone. However, when a powdery negative electrode active material is used, a negative electrode can be formed into a form that contains the negative electrode active material and a binder. Further, the negative electrode can contain a conductive material. The kind and the amount used of the binder and the conductive material can be as described above for the air electrode.

In some embodiments, the negative electrode can be provided with a negative electrode current collector. A material of the negative electrode current collector is not particularly limited as long as it has conductivity. For example, copper, stainless steel, and nickel can be used, among others. As a shape of the negative electrode current collector, for example, foil, plate, and mesh can be used. In some embodiments, a battery case can serve as a negative electrode current collector.

As an electrolytic solution, for example, a non-aqueous (i.e., organic) electrolytic solution that contains a support electrolyte salt and an organic solvent can be used. The organic solvent is not particularly limited. For example, the organic electrolyte can include, but is not limited to, propylene carbonate (PC), ethylene carbonate (EC), vinylene carbonate, dimethyl carbonate (DMC), ethyl methyl carbonate (EMC), diethyl carbonate (DEC), methylpropyl carbonate, isopropiomethyl carbonate, ethyl propionate, methyl propionate, γ-butyrolactone, ethyl acetate, methyl acetate, tetrahydrofuran, 2-methyltetrahydrofuran, ethylene glycol dimethyl ether, ethylene glycol diethyl ether, ACN, DMSO, diethoxyethane; DME, and tetraethylene glycol dimethyl ether (TEGDME).

Further, an ionic liquid can be used in or as an organic electrolytic solution. Suitable ionic liquids include, for example, but are not limited to, aliphatic quaternary ammonium salts such as N,N, N-trimethyl-N-propylammonium bis(trifluoromethanesulfonyl)amide (TMPA-TFSA], N-methyl-N-propylpiperidinium bis(trifluoromethanesulfonyl)amide (PP13-TFSA), N-methyl-N-propylpyrrolidinium bis(trifluoromethanesulfonyl)-amide (P13-TFSA), N-methyl-N-butylpyrrolidinum bis(trifluoromethanesulfonyl)-amide (P14-TFSA), and N,N-diethyl-N-methyl-N-(2-methoxyethyl)ammonium bis(trifluoromethane-sulfonyl)amide (DEME-TFSA); and alkyl imidazolium quaternary salts such as 1-methyl-3-ethyl imidazolium tetrafluoroborate ($EMIBF_4$), 1-methyl-3-ethyl imidazolium bis(trifluoromethanesulfonyl)amide (EMITFSA), 1-allyl-3-ethyl imidazolium bromide (AEImBr), 1-allyl-3-ethyl imidazolium tetrafluoroborate ($AEImBF_4$), 1-allyl-3-ethyl imidazolium bis (trifluoromethanesulfonyl)amide (AEImTFSA), 1,3-diallyl imidazolium bromide (AAImBr), 1,3-diallyl imidazolium tetrafluoroborate (AAImBF$_4$), and 1,3-diallyl imidazolium bis(trifluoro-methanesulfonyl)amide (AAImTFSA). In some embodiments, the organic electrolyte comprises AcN, DMSO, DME, PP13-TFSA, P13-TFSA, P14-TFSA, TMPA-TFSA and/or DEME-TFSA.

Any support electrolyte salt is acceptable as long as it has solubility in a electrolyte solvent and develops desired metal ion conductivity. In some embodiments, a metal salt that contains a metal ion that is desired to be conducted can be used. For example, in the case of a lithium-air battery, a lithium salt can be used as a support electrolyte salt. As a lithium salt, inorganic lithium salts such as LiPF$_6$, LiBF$_4$, LiClO$_4$, LiAsF$_6$, LiOH, LiCl, LiNO$_3$, and Li$_2$SO$_4$ can be used. Further, organic lithium salts such as CH$_3$CO$_2$Li, lithium bisoxalate borate (LiBOB), LiN(CF$_3$SO$_2$)$_2$(i.e., LiTFSA), LiN(C$_2$F$_5$SO$_2$) (i.e., LiBETA), and LiN(CF$_3$SO$_2$)(C$_4$F$_9$SO$_2$) can be used. In a nonaqueous electrolytic solution, a concentration of the support electrolyte salt can be set, though is not particularly limited, in the range of 0.5 M to 3 M, for example.

In some embodiments, the electrolyte is an aqueous electrolyte and comprises water. The aqueous electrolyte can also include a support electrolyte salt. In some embodiments, the aqueous electrolyte is alkaline. In some embodiments, the aqueous electrolyte has a pH of about 9 or higher or about 12 or higher (e.g., between 9 and 14 or between 12 and 14). In some embodiments, the pH is about 13. The pH of the aqueous electrolyte can be adjusted, for example, by the addition of a suitable metal hydroxide, e.g., KOH, NaOH, LiOH, etc. The aqueous electrolyte can also include other support salts that have solubility in water and that can develop desired ionic conductivity. A metal salt that contains a metal ion that is desired to be conducted can be used. For example, in the case of the lithium-air battery, for example, lithium salts such as LiCl, LiNO$_3$, Li$_2$SO$_4$, and CH$_3$COOLi can be used.

The electrolytic solution can be incorporated into a battery in a state where it is impregnated in a separator that has an insulating property that can ensure an insulating property between an air electrode and a negative electrode, and a porous structure that can retain the electrolytic solution. As the materials of the separator, for example, insulating resins such as polyolefins including polyethylene and polypropylene and glasses can be cited. Further, as a porous structure of the separator, for example, a mesh structure where structural fibers are regularly arranged, a nonwoven fabric structure where structural fibers are arranged at random, and a three-dimensional network structure having independent pores or coupling holes can be cited. A thickness of the separator can be, for example, about 10 to 500 microns.

Electrolyte gels can be obtained by gelating the electrolytic solutions described above. For example, as a method of gelating a nonaqueous electrolytic solution, a, polymer such as polyethylene oxide (PEO), polyacrylonitrile (PAN), polyvinylidene fluoride (PVDF) or polymethyl methacrylate (PMMA) can be added to a nonaqueous electrolyte solution. An electrolyte gel can be formed, for example, in such a manner that, after the polymer and the electrolytic solution, which were described above are mixed, the mixture is coated by casting on a base material and dried, the dried mixture is peeled off the base material, and cut into pieces as required.

Solid electrolytes can be appropriately selected in accordance with a conductive metal ion without particular limitation. For example, in the case of a lithium-air battery, LISICON (i.e., lithium super ionic conductor) oxides represented by Li$_a$X$_b$Y$_c$P$_d$O$_e$ (wherein X represents at least one kind selected from the group of B, Al, Ga, In, C, Si, Ge, Sn, Sb and Se; Y represents at least one kind selected from the group of Ti, Zr, Ge, In, Ga, Sn and Al; and a to e satisfy relationships of 0.5≤a≤5.0, 0≤b≤2.98, 0.5≤c<3.0, 0.02<d.≤3.0, 2.0<b+d<4.0, and 3.0<e≤12.0); perovskite oxides such as Li$_x$La$_{1-x}$TiO$_3$; LISICON oxides such as Li$_4$XO$_4$—Li$_3$YO$_4$ (wherein X represents at least one kind selected from Si, Ge and Ti, and Y represents at least one kind selected from P, As and V) and Li$_3$DO$_3$-Li$_3$YO$_4$ (wherein D represents B, Y represents at least one kind selected from P, As and V); and garnet oxides of Li—La—Zr—O based oxides such as Li$_7$La$_3$Zr$_2$O$_{12}$ can be used. The solid electrolyte can be molded, for example, by rolling, or by preparing a slurry by mixing with a solvent, by coating, and by drying.

The presently disclosed batteries can also have other constituent members other than the air electrode, electrolyte (s), and negative electrode, which were described above. Typically, the battery can have a battery case for housing an air electrode, a negative electrode and an electrolyte. The shape of the battery case is not particularly limited. For example, a coin shape, a flat plate shape, a cylindrical shape, and a laminate shape can be used. The battery case can be either an open atmosphere type or a hermetically sealed type as long as it can feed oxygen to the air electrode. The open atmosphere type battery case has a structure where at least an air electrode is capable of sufficiently coming into contact with atmosphere. For instance, the case can include oxygen-intake holes that communicate with the air electrode. The oxygen-intake holes can include an oxygen transmitting membrane that can selectively transmit oxygen. In some embodiments, a polysiloxane-based membrane can be used. On the other hand, in a hermetically sealed type battery case, an inlet pipe and an outlet pipe of oxygen (air) can be provided.

Figure 11:
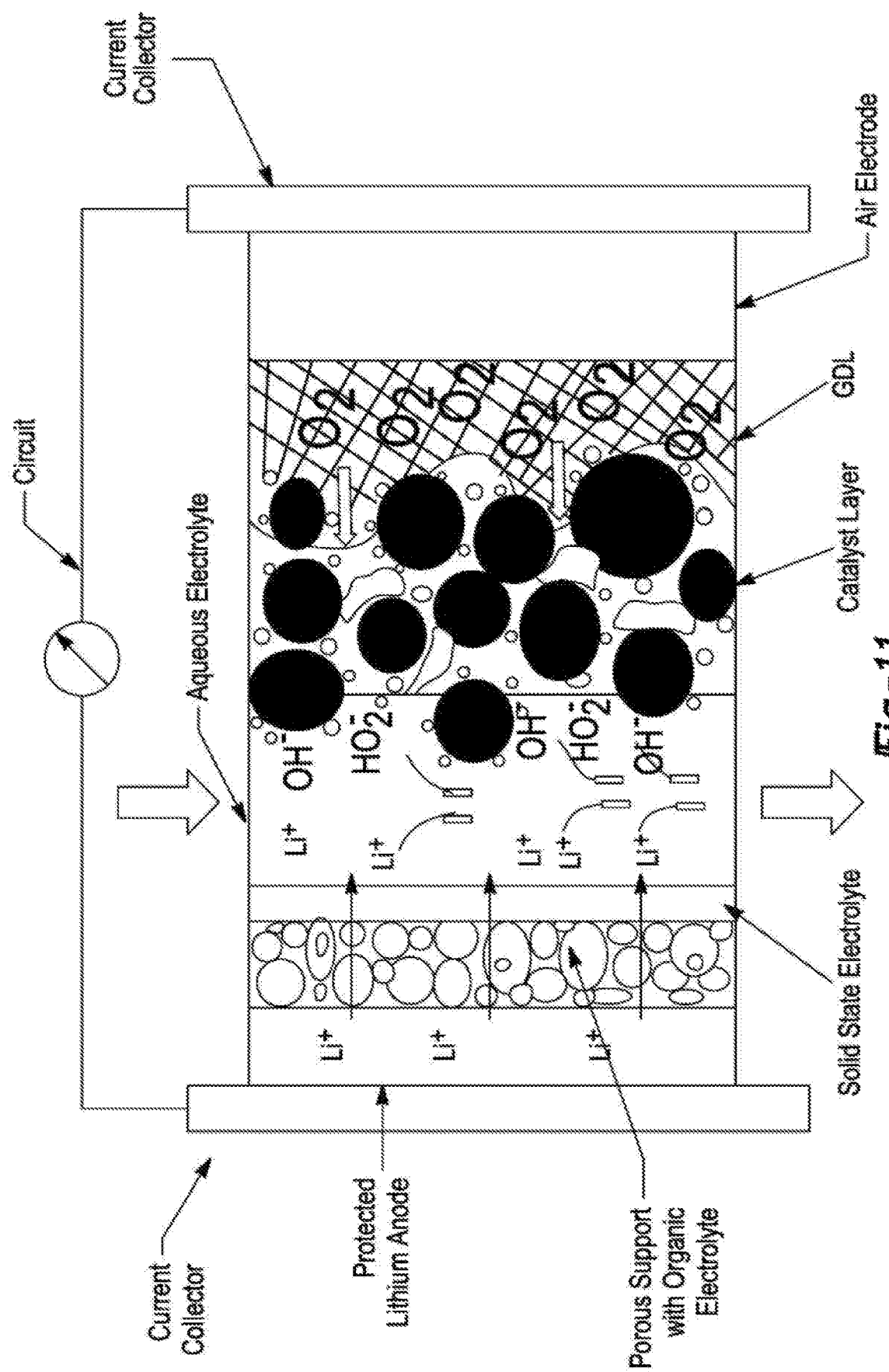
FIG. 11 is a schematic drawing showing a lithium air battery structure according to another embodiment of the presently disclosed subject matter. The flow of anions is shown for the battery discharge. Lithium anions ($Li^+$) are conducted from a protected lithium anode though a porous support containing an organic electrolyte and also through a solid state electrolyte to an aqueous alkaline electrolyte. The aqueous alkaline electrolyte is in contact with a catalyst layer that is associated with the gas diffusion layer (GDL) of an air electrode. Oxygen from the air electrode is reduced to hydroperoxide ($HO_2$) by the catalyst. The alkaline electrolyte can flow through the cell (see thick grey arrows) via an Inlet and outlet In the cell. Current collectors and a circuit for current flow are also shown.

In some embodiments, the presently disclosed subject matter provides, as an exemplary electrochemical cell, a lithium air battery that comprises a lithium electrode, a porous support comprising an organic electrolyte; a solid state electrolyte, an aqueous electrolyte, a layer comprising the catalyst, and an air electrode. One possible configuration of such a battery is shown in FIG. 11. As shown in FIG. 11, the battery can include a protected lithium electrode that is in contact with the porous support material. The porous support material comprising an organic electrolyte is disposed between the anode and the solid state electrolyte. The organic electrolyte can comprise, for instance, DMSO and LiClO$_4$; but can also comprise another organic electrolyte and/or salt as described hereinabove. In some embodiments, the solid state electrolyte is a LISICON material.

In some embodiments, the porous support can have a thickness of about 200 microns. In some embodiments, the solid state electrolyte can have a thickness of between about 3 microns and about 5 microns. However, the support material and solid state electrolytes can have any suitable or desired thickness. In some embodiments, the support material and solid state electrolyte can be as thin as possible while still having mechanical stability.

Referring again to FIG. 11, the solid state electrolyte in turn is disposed between the porous support material and the aqueous electrolyte (e.g., an alkaline aqueous electrolyte). Accordingly; lithium from the lithium electrode can be reduced to lithium anions and be delivered to the aqueous electrolyte though the porous support and the solid state electrolyte, while the lithium electrode is protected from water in the aqueous electrolyte.

The aqueous electrolyte is also in contact with a catalyst layer that is in contact with a gas diffusion layer (GDL) of an air electrode. The GDL is a porous structure (e.g., a carbon cloth or paper) that delivers oxygen ($O_2$) from the air electrode to the catalyst layer, where it is reduced to hydroxide. In some embodiments, the aqueous electrolyte has a pH of about 13 or more. In some embodiments, the aqueous electrolyte can further comprise a peroxide stabilizer, such as sodium silicate or a transition metal ion complexing or chelating agent, such as EDTA or DTPA or another aminopolycarboxylic acid, or a phosphonate. As shown in FIG. 11, the lithium air battery can have a flowing electrolyte, in that the battery can include an inlet and an outlet for the aqueous electrolyte, so that it can flow through the cell, transferring lithium peroxide formed during discharge out of the cell, e.g., where it can be stored in a solid phase. Thus, in some embodiments, the cell is connected (i.e., via the inlet and outlets) to one or more storage and/or separation units, containers or tanks where the lithium peroxide can be separated from the aqueous electrolyte solution and/or stored. The cell can also include current collectors associated with the lithium anode and the air electrode and a circuit to carry electric current. In some embodiments, the one or more storage and/or separation units is/are configured to store discharge product, such as but not limited to air electrode discharge product, as a condensed liquid or solid. In some embodiments, the storage unit or tank is used to preserve the air electrode discharge product when the battery discharges. For a better preservation purpose, a separation process can be employed to separate the discharge product from the bulk electrolyte phase to preserve the discharge product in a solid phase or condensed liquid phase.

Figure 10A:
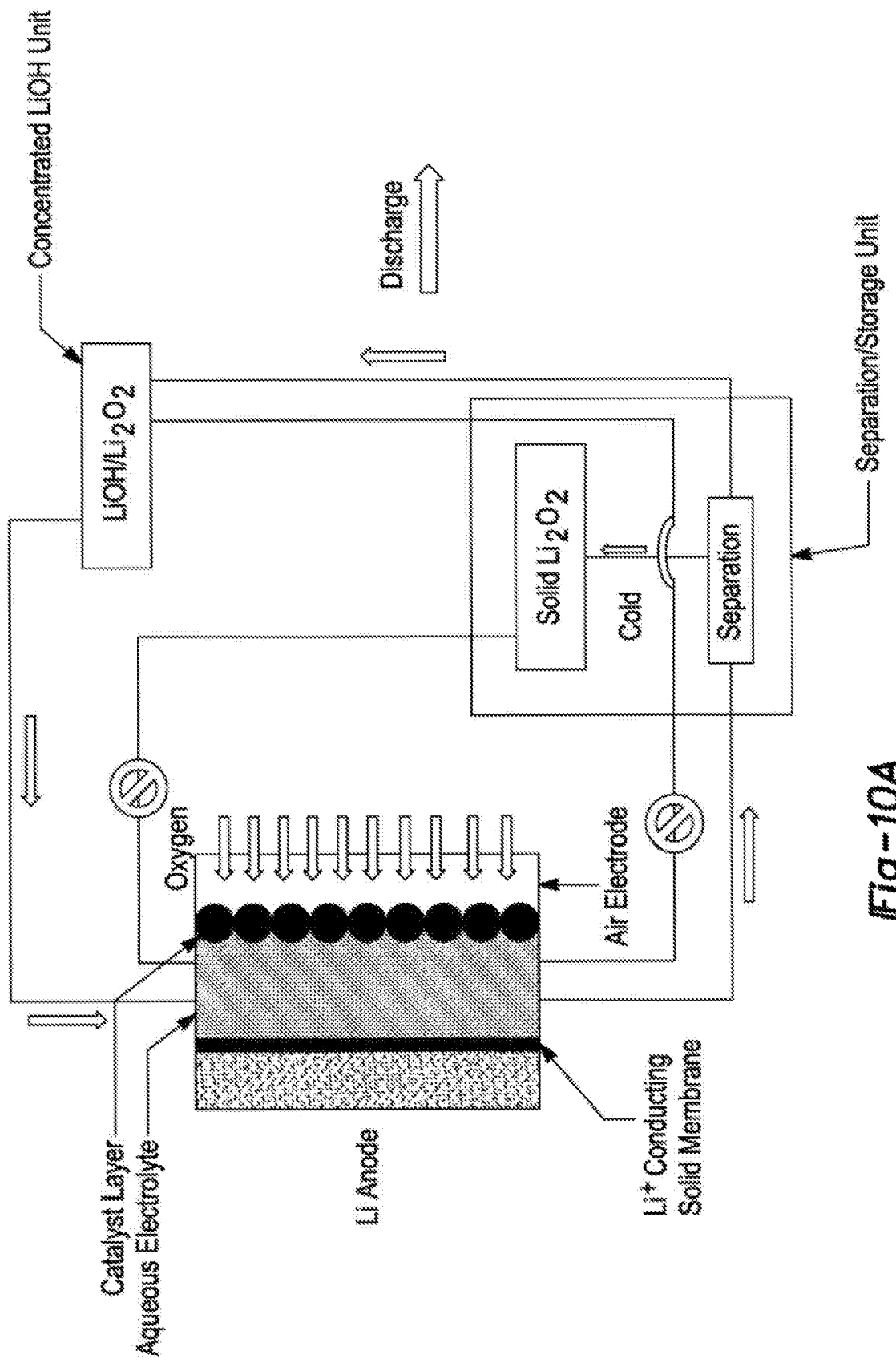
FIG. 10A is a schematic drawing showing a discharge diagram of a lithium air battery according to an embodiment of the presently disclosed subject matter. The battery comprises a flowing electrolyte structure and is part of a system that further comprises a unit for the separation and storage of lithium peroxide ($Li_2O_2$) outside of the battery cell. The cell also includes a catalyst layer in contact with the flowing aqueous electrolyte and the air electrode, as well as a lithium ion ($Li^+$) conducting solid membrane disposed between the aqueous electrolyte and the lithium anode.

FIGS. 10A and 10B further illustrate an embodiment of the presently disclosed subject matter that comprises a flowing electrolyte lithium air battery. FIG. 10A shows the lithium air battery with a flowing aqueous electrolyte during discharge. The battery includes a lithium anode, a lithium ion conducting solid membrane, an aqueous electrolyte, a catalyst layer and an air electrode. During discharge, lithium peroxide ($Li_2O_2$) is formed in the aqueous electrolyte. From an outlet in the cell, the electrolyte can flow from the cell to a separation tank, where, for example, the electrolyte can be cooled to cause precipitation of the lithium peroxide. The remaining aqueous electrolyte can leave the separation tank via an outlet and be contacted with concentrated LiOH and the resulting alkaline electrolyte circulated back into the cell via a cell inlet. The electrolyte can still include some $Li_2O_2$ due to incomplete separation in the separation/storage unit. FIG. 10B shows the same lithium air battery during charging. In some embodiments, the one or more storage and/or separation units is/are configured to store discharge product, such as but not limited to air electrode discharge product, as a condensed liquid or solid. In some embodiments, the storage unit or tank is used to preserve the air electrode discharge product when the battery discharges. For a better preservation purpose, a separation process can be employed to separate the discharge product from the bulk electrolyte phase to preserve the discharge product in a solid phase or condensed liquid phase.

Energy density for the battery can be calculated from the energy that can be stored divided by the mass of lithium metal and how much water is needed to store the lithium peroxide in the separation/storage unit. Assuming that 1 equivalent of $H_2O$ per lithium ion is needed to dissolve and precipitate out one molecule of $Li_2O_2$ so that it can be stored, the energy density can be 3277 watt-hours (Wh)/kg. If 2 equivalents of $H_2O$ is needed, the energy density can be 1903 Wh/kg. If 3 or 4 equivalents of $H_2O$ is needed, the energy density can be 1341 or 1035 Wh/kg, respectively.

Figure 12:
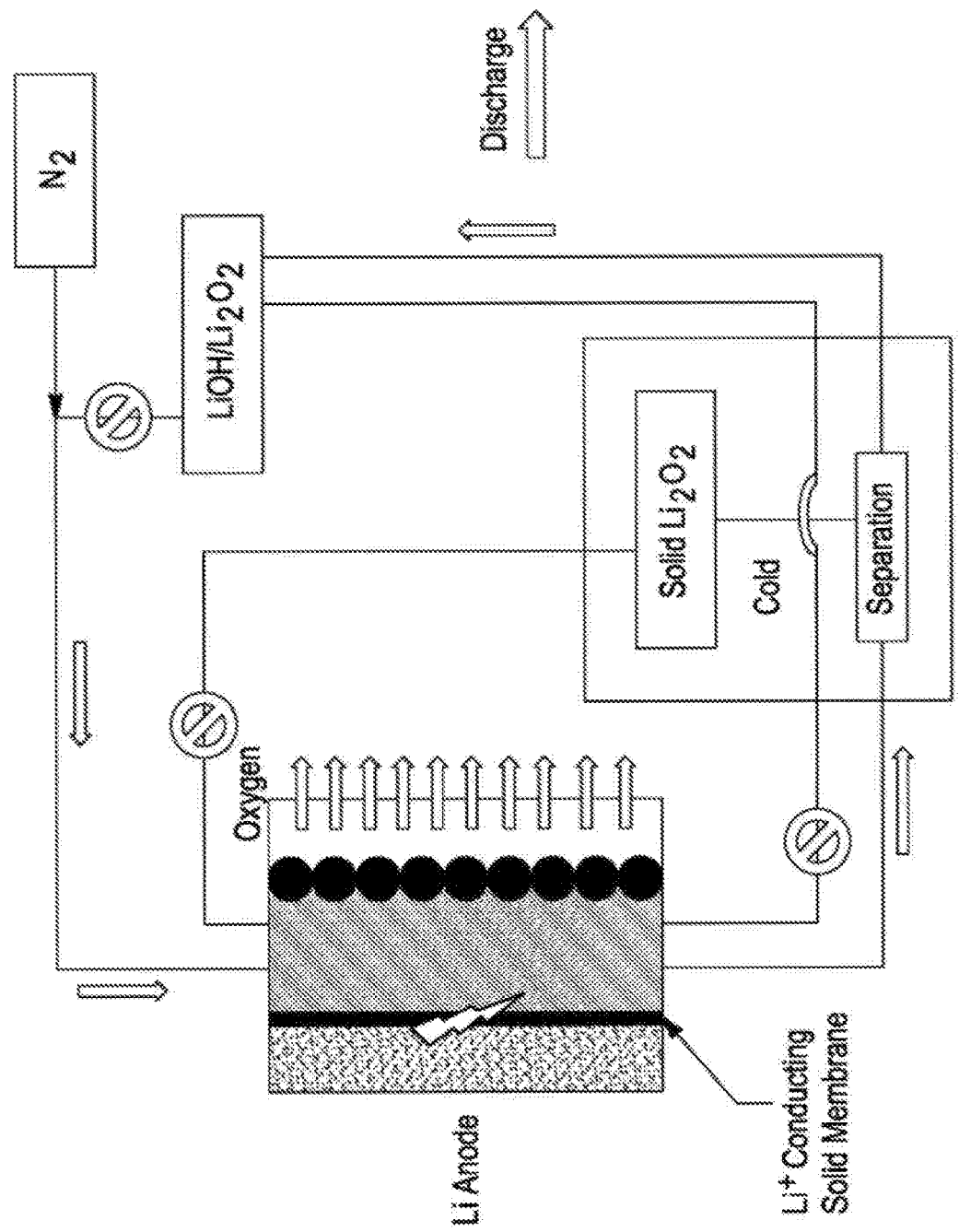
FIG. 12 is a schematic drawing showing a lithium air battery structure according to another embodiment of the presently disclosed subject matter, wherein a safety procedure is provided to control the battery explosion hazard to minimum when receive outside collision accident

Referring now to FIG. 12, a safety procedure is provided to control the battery explosion hazard to minimum when receive outside collision accident. When receiving outside collision accident, the thin solid Li+ conducting electrolyte can be cracked. If lithium metal gets in touch with aqueous electrolyte, it will generate a lot of hydrogen, and this might lead to potential explosion. The special safety procedure shown above can minimize this hazard. When receiving outside accident, the electrolyte inlet starts sending inert gases into the cell rather than normal aqueous electrolyte. At the same time, the electrolyte outlet of the cell still purging aqueous electrolyte out of the cell to minimize the amount of water that can get in touch with lithium metal. And incoming oxygen is also cut from the cathode side, and the rest of the oxygen is moved out of the cell with nitrogen. This whole process can reduce the potential explosion of aqueous lithium-air battery.

Thus, continuing with reference to FIG. 12, in accordance with some embodiments, a cell is configured to provide one or more of the following in the event of an accident: (i) the electrolyte inlet sends an inert gas into the cell rather than aqueous electrolyte; (ii) the electrolyte outlet of the cell purges aqueous electrolyte out of the cell to minimize the amount of water that can get in touch with metal, optionally lithium metal; and (iii) incoming oxygen is cut from the cathode side and the rest of the oxygen is moved out of the cell with nitrogen. Optionally (i), (ii) and/or (iii) occur at the same time.

Figure 9A:
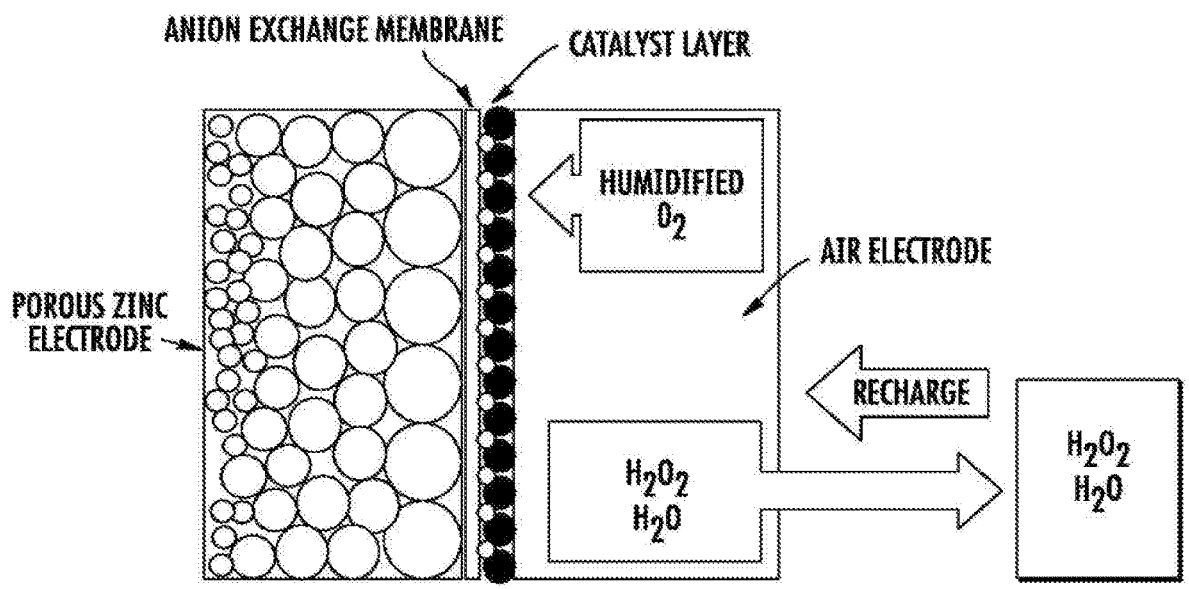
FIG. 9A is a schematic drawing showing a reversible zinc air battery according to an embodiment of the presently disclosed subject matter. The battery includes an anion exchange membrane disposed between a porous zinc electrode and an air electrode. The air electrode is associated with a layer of gold/cobalt salen catalyst. An aqueous electrolyte (not shown) can be in contact with the catalyst layer and the anion exchange membrane. The battery is configured to transport aqueous hydrogen peroxide ($H_2O_2$ in $H_2O$) solution out of the battery for storage and back into the battery during recharging.

In some embodiments, the presently disclosed subject matter provides a zinc air battery. In some embodiments, the zinc air battery comprises an air electrode as described herein above, a zinc electrode, and one or more electrolytes. In some embodiments, the zinc air battery comprises a zinc electrode (e.g., a porous zinc electrode), an anionic exchange membrane, and an air electrode associated with a layer comprising the catalyst. For instance, as shown in FIG. 9A, the anion exchange membrane can be in contact with a surface of the zinc electrode and with the layer comprising the catalyst, and the layer comprising the catalyst can be in contact with both the anion exchange membrane and the air electrode and/or a gas diffusion layer associated with the air electrode. Oxygen can be transported from the air electrode to the catalyst layer and reduced to peroxide. The battery can further include an outlet to transport aqueous hydrogen peroxide solution out of the battery (e.g., from an outlet in the air electrode) for separation and/or storage. Thus, in some embodiments, for example, the air electrode is in flow communication with a storage tank containing an aqueous solution of hydrogen peroxide. The other discharge product, i.e., zincate, formed from zinc oxide and alkaline can form a solid complex that can be preserved, through use of the membrane, on the surface of the zinc electrode and/or replace the zinc electrode active material.

In some embodiments, the aqueous solution of hydrogen peroxide comprises a peroxide stabilizer. In some embodiments, the peroxide stabilizer is optionally sodium silicate or a transition metal ion complexing or chelating agent. In some embodiments, the peroxide stabilizer is ethylenediamine tetraacetic acid (EDTA), diethylenetriaminepentaacetic acid (DTPA) or a phosphonate. In some embodiments, the at least one outlet and the at least one inlet are connected to one or more storage and/or separation tanks. In some embodiments, the one or more storage and/or separation units is/are configured to store discharge product, such as but not limited to air electrode discharge product, as a condensed liquid or solid. In some embodiments, the storage unit or tank is used to preserve the air electrode discharge product when the battery discharges. For a better preservation purpose, a separation process can be employed to separate the discharge product from the bulk electrolyte phase to preserve the discharge product in a solid phase or condensed liquid phase. In some embodiments, the hydrogen peroxide is transferred out of the cell for storage, purification, and/or stabilization.

In some embodiments, the presently disclosed subject matter provides an electrochemical cell that can be used in the fuel cell or electrolyser mode, and that comprises the presently disclosed catalyst. One mode (i.e., the fuel cell) inputs hydrogen, while the other inputs electricity. The catalyst can be part of an air electrode, as described hereinabove. In some embodiments, the presently disclosed subject matter can provide a fuel cell comprising the presently disclosed catalyst (i.e., as part of a gas diffusion electrode which, in some embodiments, can have a modified Au mesh or Au nanoparticles catalyst prepared via electropolymerization of a cobalt coordination complex of Formula (I)) and that can further comprise a hydrogen source and be useful in the production of hydrogen peroxide. See FIG. 8A, right-hand side. An aqueous alkaline electrolyte can flow through the cell. Peroxide dissolved in the electrolyte can be carried out of the cell, as indicated by the thick arrow. The reactions at the anode and cathode can be as follows:

Anode: $H_2 + 2OH^- \rightarrow 2e^- + 2H_2O$

Cathode: $O_2 + 2H_2O + 2e^- \rightarrow 2OH^- + H_2O_2$

The left-hand side of FIG. 8A shows an electrolyser comprising the presently disclosed catalyst (i.e., as part of a gas diffusion electrode which, in some embodiments, can have a modified Au mesh catalyst prepared via electropolymerization of a cobalt coordination complex of Formula (I)). It further uses a nickel mesh as an oxygen evolution catalyst (i.e., as part of the anode) and an anion exchange membrane between the anode and cathode. Hydrogen peroxide can be removed from the cell via an outlet in the cathode (e.g., as an aqueous solution). The reactions at the anode and cathode can be as follows:

Anode: $4OH^- \rightarrow 4e^- + 2H_2O + O_2$

Cathode: $O_2 + 4H_2O + 2e^- \rightarrow 2OH^- + H_2O_2$

V. Methods of Performing Two Electron, Reversible Oxygen Reduction

In some embodiments, the presently disclosed subject matter provides a method for performing a two electron reduction of oxygen, wherein the method comprises contacting oxygen with water in the presence of a catalyst comprising gold and a cobalt coordination complex. In some embodiments, the reduction is reversible or near-reversible, both chemically and electrochemically. In some embodiments, the cobalt coordination complex comprises cobalt chelated to a tetradentate organic chelating ligand. In some embodiments, the organic chelating ligand is N,N'-bis(salicylidene)ethylenediamine or a derivative or polymer thereof. In some embodiments, the coordination complex has a structure of Formula (I), above, or a polymer thereof. In some embodiments, the cobalt coordination complex is cobalt salen, a thiophene modified cobalt salen, or cobalt salophen.

In some embodiments, the weight ratio of gold to cobalt coordination complex is any suitable ratio, such as but not limited to 1:5, 1:6, 1:7, 1:8, 1:9, and 1:10. In some embodiments, the cobalt coordination complex is in an aqueous solution in contact with the gold. In some embodiments, the cobalt coordination complex is present in a coating covering a surface of a gold structure, such as, but not limited to, bulk gold, a gold film or gold-containing nanoparticles. In some embodiments, the cobalt coordination complex is polymerized (e.g., electropolymerized) over a gold surface. In some embodiments, the catalyst is present in an electrochemical cell, e.g., as part of an air electrode.

In some embodiments, the contacting of the oxygen and the catalyst is performed in an alkaline aqueous solution that is saturated with oxygen. The aqueous solution can also include one or more electrolyte support salts. The alkaline solution can have a pH of at least 9 or of between about 9 and about 14. In some embodiments, the pH is between about 12 and about 14 (e.g., about 12, 12.5, 13, 13.5 or 14). In some embodiments, the pH is about 13. In some embodiments, the alkaline solution comprises a metal hydroxide, such as KOH, NaOH, or LiOH. In some embodiments, the metal hydroxide concentration is about 0.1 M or more. In some embodiments, the metal hydroxide concentration is about 1.0 M or about 3.0 M. Thus, in some embodiments, the contacting is performed in an alkaline environment that is also saturated with oxygen.

In some embodiments, the contacting is further performed in the presence of a peroxide stabilizer, such as sodium silicate or a transition metal ion chelating group. In some embodiments, the peroxide stabilizer is an aminopolycarboxylic acid, such as, ethylenediaminetetraacetic acid (EDTA) or diethylenetriaminepentaacetic acid (DTPA), or a phosphonate.

In some embodiments, the contacting is performed at a temperature of between about −20° C. and about 80° C. In some embodiments, the contacting is performed at a temperature of between 20° C. and about 80° C. In some embodiments, the contacting is performed at a temperature of between about 20° C. and about 50° C. (e.g., at about 20, 25, 30, 35, 40, 45, or about 50° C.). In some embodiments, the contacting is performed at a temperature of between about 20° C. and about 35° C.

In some embodiments, the reduction produces hydrogen peroxide. Thus, in some embodiments, the presently disclosed subject matter provides a method comprising contacting oxygen with an aqueous solution (e.g., an alkaline aqueous solution) in the presence of a catalyst comprising gold and a cobalt coordination complex to provide hydrogen peroxide. In some embodiments, the catalyst comprises gold and a cobalt coordination complex of Formula (I) or a polymer thereof. In some embodiments, the cobalt coordination complex is cobalt salen, a thiophene modified cobalt salen, or cobalt salophen.

In some embodiments, the catalyst is present in a fuel cell comprising a source of oxygen. In some embodiments, the catalyst is present in an electrochemical cell further comprising a zinc electrode, an air electrode, and an anion exchange membrane, wherein the anion exchange membrane is present between the zinc electrode and the air electrode, the catalyst is contact with the air electrode and/or a gas diffusion layer of the air electrode, and optionally wherein the zinc electrode is porous.

In some embodiments, the catalyst is present in an electrochemical cell further comprising a hydrogen electrode or a oxygen evolution electrode. In some embodiments, between the two electrodes, an alkaline electrolyte is used, which optionally can be an anion exchange membrane or an aqueous alkaline electrolyte. In some embodiments, the hydrogen peroxide can be stored, purified, and/or stabilized.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Materials and Methods

Electrode Preparation:

Three types of 5 mm diameter disk electrodes were purchased from Pine Research Instrumentation (Durham, N.C., United States of America) for use in the studies described below: polycrystalline gold (Pine Research Instrumentation part number AFE2A050AU for room temperature; part number AFE5TO50AUHT for high temperature); glassy carbon (part number AFE2A050GC) for room temperature; and polycrystalline platinum (part number AFE5TO50PTHT) for high temperature. The polycrystalline metal electrodes were mechanically cleaned by polishing with 5 μm alumina powder and then with 0.05 μm powder (Beuhler, Dusseldorf, Germany). Then, the mechanically cleaned metal electrodes were electrochemically cleaned by CV in a 2.2 V scan range with 50 mV/s scan rate in 0.1 M $HClO_4$ acid electrolyte to remove covalently bonded chemical. The electrodes were also scanned in the normal electrochemical window for several cycles until the standard CV features were stable. The glassy carbon disk was mechanically cleaned, but not electrochemically cleaned.

In addition, two RRDE electrodes (also from Pine Research Instrumentation, Durham, N.C., United States of America) were used: a gold disk RRDE with a 5 mm diameter gold insert disk (part number AFED050P040AU) and a platinum ring (part number AFE6R1PT; 6.5 mm inner diameter 7.5 mm outer diameter; collection efficiency 25%); and a glassy carbon disk RRDE (part number AFE7R9GCPT), having a glassy carbon disk diameter of 5.61 mm, a ring inner diameter of 6.25 mm; an outer diameter of 7.92 mm, and a collection efficiency of 37%. Both RRDE electrodes were cleaned as described for the disk electrodes, with the disk electrode and ring electrodes going through the electrochemical cleaning procedure separately.

Modified Electrode Preparation:

Three kinds of modified electrodes were prepared: a cobalt salen modified polycrystalline gold electrode, a Pt/C catalyst modified glassy carbon electrode; and an Au/C catalyst modified glassy carbon electrode. More particularly, for some studies, experiments were conducted in a cobalt salen-containing electrolyte. However, a thin film modification method was adopted to make a quasi-stable cobalt salen modified electrode. According to this method, a clean polycrystalline gold disk electrode (polycrystalline gold RDE or RRDE) was prepared and then 15 μl of a 2 mM cobalt salen solution was deposited on the surface of the gold electrode. The electrode was dried for 30 minutes and a thin layer film was formed of the surface of the electrode.

The Pt/C catalyst and Au/C modified glassy carbon electrode were prepared by depositing 12 μp ink on the surface of a glassy carbon electrode. The ink was prepared using 5% NAFION™ solution (Sigma Aldrich, St. Louis, Mo., United States of America) in a 30/70 ionomer to catalyst ratio in methanol. The 30% Pt/C catalyst (BASF, Florham Park, N.J., United States of America) had nano Pt particles of a diameter of about 2 nm. The Au/C catalyst was prepared by two different methods, the Turkevich method and magnetron sputtering, using two different nanoparticle sizes, referred to as Au/C-a and Au/C-b.

According to the first method, an aqueous solution of chloroauric acid ($H[AuCl_4]$, 88.4 mg in 400 ml $H_2O$) was heated to 70° C. Then trisodium citrate solution (212 mg in 4 ml $H_2O$) was added to start to reduce the chloroauric acid and the mixture was stirred for 3 hours at 70° C. After the solution was cooled, an ethanol dispersion of carbon black (XC-72, Cabot Corporation, Boston, Mass., United States of America) was added, the mixture was stirred for 20 minutes and then centrifuged. The solids were washed with ethanol and water and vacuum dried to provide a fine powder-like catalyst. The gold-to-carbon ratio was calculated from the ratio of starting materials to be about 30% by weight. The size of the nanoparticles was determined using the Scherrer equation and X-ray diffraction (XRD) data to be about 18 nm.

Alternatively, the Au/C catalyst was prepared by magnetron sputtering by first placing the carbon black and two TEFLON® coated stir bars in a set of stainless steel cups attached to a vacuum compatible motor. A high purity gold target (99.99%) was sputtered at an applied power of 14 W for 160 minutes, by direct current magnetron sputtering in an argon (Ar) atmosphere onto the continuously rotating carbon black. Gold loading was determined using an inductively coupled plasma (ICP) optical emission spectrometer to be 4.77%, and average particle size (determined from scanning transmission electron microscopy (STEM) data) was about 1.8 nm.

Electrochemical Measurements:

Electrochemical measurements were conducted in a standard three-compartment electrochemical cell sealed from the ambient environment. For RDE studies, a modulated speed rotator (Pine Research Instrumentation, Durham, N.C., United States of America) was used. A potentiostat (SP-200, Bio-Logic SAS, Claix, France) was used for measurements for three-electrode cell systems and a multichannel potentiostat (VMP3, Bio-Logic SAS, Claix, France) was used for RRDE four electrode systems. A gold wire counter electrode was separated from the working electrode by a porous glass frit. A Hg/HgO reference electrode or a double function saturated Ag/AgCl reference electrode was used for measurements in alkaline electrolyte and a saturated $Hg/HgSO_4$ reference electrode was used for measurements in acidic electrolytes. In some instances, the reference electrode was calibrated to the reversible hydrogen electrode (RHE) by sparging the cell with $H_2$ and measuring the open circuit potential at a Pt working electrode. For RDE experiments, a TEFLON® plug with a bearing was used to cap the electrode entrance and fit snugly around the shaft of a rotating electrode. Either $O_2$ or Ar atmospheres were maintained with a slight positive pressure generated by a water or oil bubbler on the gas outlet from the cell.

For alkaline electrolyte electrochemical measurements, alkaline solution was made with potassium hydroxide, lithium hydroxide (both from Sigma Aldrich, St. Louis, Mo., United States of America) and Mili-Q water. A glass electrochemical cell (part number RRPG085, Pine. Research Instrumentation, Durham, N.C., United States of America) with a water jacket was used for temperature controlling experiments, and a heated water bath circulator was used to control the temperature. EDTA (Sigma-Aldrich, St. Louis, Mo., United States of America) was used as a peroxide stabilizer. For organic electrolyte electrochemical measurements, the glass electrochemical cell was dried in the oven to remove water and an organic electrolyte was prepared with acetonitrile (J.T. BAKER® brand, Avantor Performance Materials, Center Valley, Pa., United States of America) and tetrabutylammonium bromide (TBAB, Sigma-Aldrich, St. Louis, Mo., United States of America). Cobalt salen (Sigma-Aldrich, St. Louis, Mo., United States of America) was used in both aqueous and organic electrolyte.

Before every electrochemical measurement, the potential was held at open-circuit voltage (OCV) for 30 minutes. For the cyclic voltammetry (CV) studies, after the OCV potential holding, the potential was scanned from the OCV potential to the lower potential and then back again.

Tafel plots were prepared by plotting the log (current density) versus potential from a related RDE study kinetic region. The HCD (high current density) range tafel slope was calculated by selecting data points from 0.1 mA/cm$^2$ to 1 mA/cm$^2$. The LCD (low current density) range tafel slope was calculated by selecting data points from 0.01 mA/cm$^2$ to 0.1 mA/cm$^2$.

Example 2

Oxygen Reduction on Cobalt Salen Modified Gold Electrode

A polycrystalline Au electrode was mechanically and electrochemically cleaned as described above in Example 1. It was then tested in a pure alkaline electrolyte solution (1 M KOH saturated with oxygen). Then 10 µl of a 1 M KOH+2 mM cobalt salen solution was deposited on the electrode surface and dried for 30 minutes, forming a thin film. The thin film-modified electrode was placed back into the alkaline electrolyte solution. FIG. 1 shows a comparison of the ORR CV of the electrode before and after modification with the cobalt salen thin film.

FIG. 1 shows CVs indicating that the modified Au electrode (solid line CV) processes a two electron, reversible oxygen reduction reaction. In the solid line CV, oxygen reduction occurs in the cathodic scan and oxygen evolution in the anodic scan. For the unmodified Au electrode (dotted line), there is oxygen reduction in the cathodic scan, but no oxygen evolution in the anodic scan.

Figure 2:
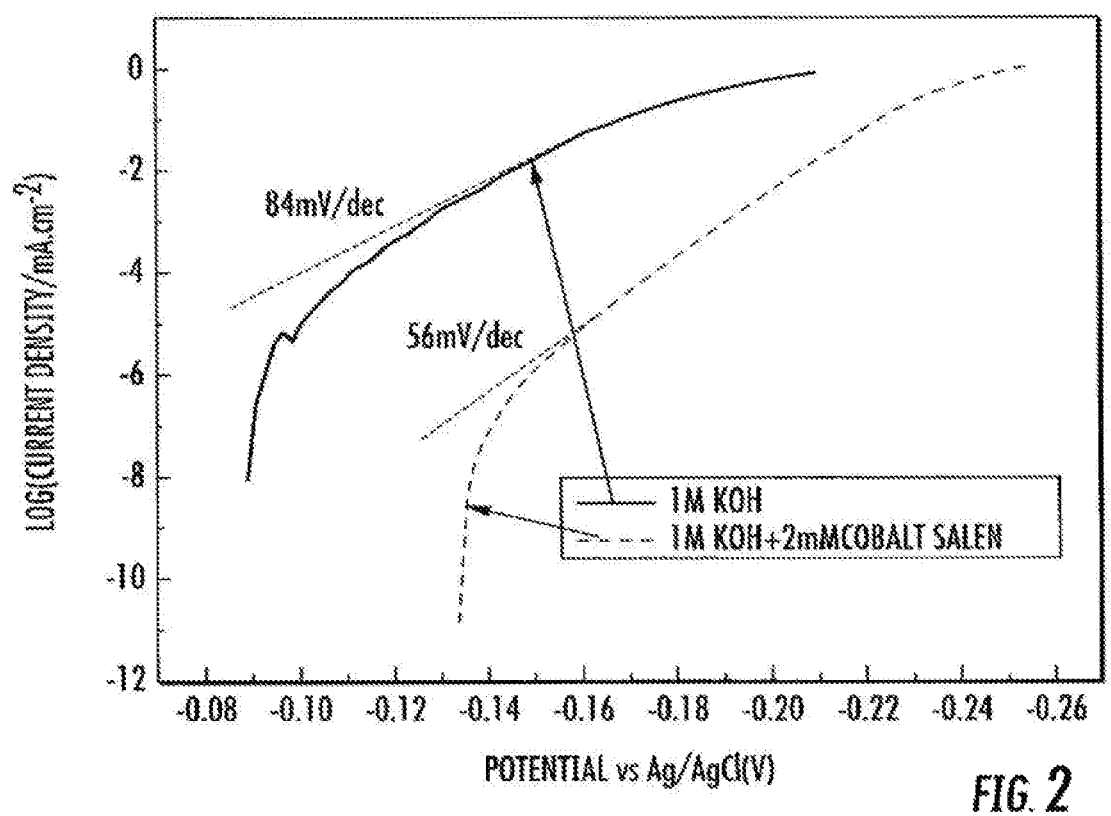
FIG. 2 is a graph showing the tafel plots for oxygen reduction on a rotating disk polycrystalline gold electrode in 1 Molar (1 M) potassium hydroxide (KOH) electrolyte and in an electrolyte comprising 1 Molar KOH and 2 milliMolar (mM) cobalt salen. The scan rate was 10 milliVolts per second (mV/s); the revolutions per minute (rpm) of the electrode was 1000; the electrode surface area was 0.19625 square centimeters ($cm^2$); the reference electrode was silver chloride (AgCl); and the counter electrode was gold wire.

FIG. 2 shows tafel plots of data from RDE experiment data to characterize the kinetics of the electrochemical reactions of the modified and unmodified Au electrode in the alkaline, oxygen-saturated electrolyte. From the plots in FIG. 2, it appears that the slope of the plot related to the modified electrode has a lower value (56 mV/decade (dec) at HCD range and 36 mV/dec at LCD range), indicating that oxygen reduction is faster with the modified electrode.

Figure 3B:
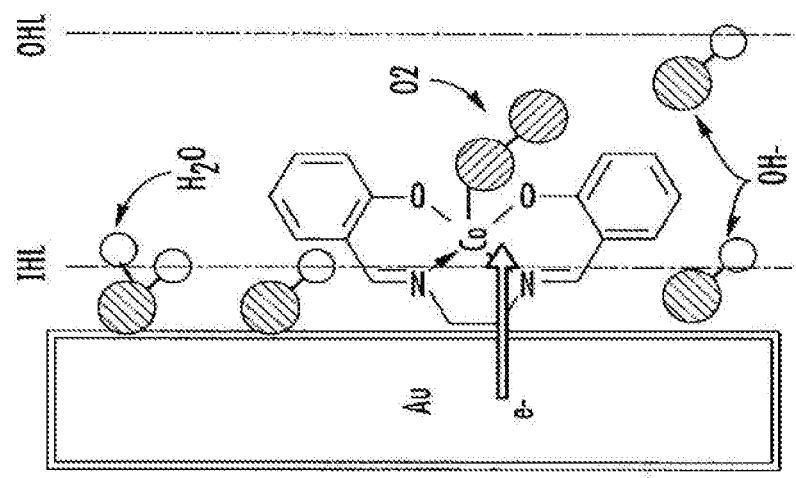
FIG. 3B is a schematic drawing showing how electron transfer via a tunneling phenomenon from a gold (Au) surface to an oxygen molecule ($O_2$) bonded to cobalt salen on the surface of the gold. The drawing also shows water molecules ($H_2O$) and hydroxide ions (OH) associated with the Outer Helmholtz Layer (OHL) and the Inner Helmholtz Layer (IHL) of the Au surface.
Figure 3A:
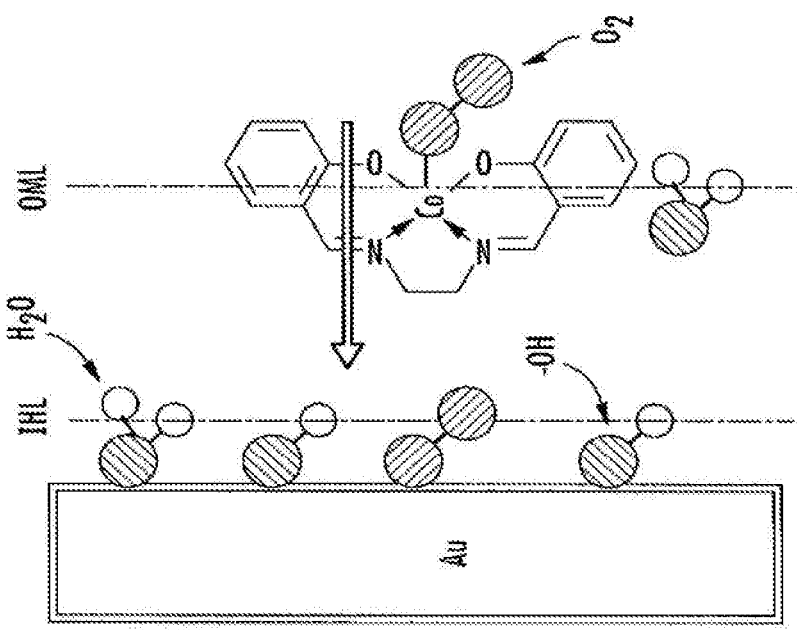
FIG. 3A is a schematic drawing showing a stretched oxygen molecule ($O_2$) bonded to cobalt salen In the Outer Helmholtz Layer (OHL) of a gold (Au) surface can be transferred to the Inner Helmholtz Layer (IHL) on the surface. The drawing also shows water molecules ($H_2O$) and hydroxide ions (OH) associated with the OHL and IHL.

It has previously been suggested that the rate limiting step of ORR on bare gold surfaces is the first electron transfer (see Zurilla, R. W., *Electrochim. Acta* (1978), 125, 1103; and Erickson, H., et al., *Electrochim. Acta* (2009), 54, 7483-7489), which can be related to the chemisorption of oxygen onto the gold surface: $O_2+e^-\rightarrow O_2^-(ads)$. Thus, without being limited to any one theory, the rate improvement with the cobalt salen film-modified Au electrode is believed to be related to enhanced oxygen chemisorption on the Au surface that is associated with reversible bonding of oxygen to cobalt salen. Since it is further believed that the cobalt salen is interacting with the gold surface via physisorption (i.e., adsorbtion via weak Van der Waals forces), rather than being more strongly associated, such as by being chemrisorbed on the Au, again without being bound to any one theory, it is suggested that the cobalt salen is within the Outer Helmholtz Layer (OHL) of the gold surface. When an oxygen molecule bonds to the cobalt salen, it can have a lower electron density and be a better electron acceptor compared to normal oxygen. Based on calculations, the oxygen molecule length when bonded to cobalt salen complexes is in the range of 1.28 to 1.29 angstroms, which is the same as the molecule length when oxygen is chemisorbed on Au. Thus, it is possible that pre-interaction of $O_2$ with cobalt salen stretches the molecule, making it more readily chemisorbed on Au. See FIG. 3A. Alternatively, cobalt can become a reaction center and finish the first electron reaction via a tunneling electron transfer from the Au surface. See FIG. 3B.

Example 3

Effects of pH and Temperature

Temperature:
The catalytic activity of a gold electrode in an oxygen saturated alkaline electrolyte containing cobalt salen (1 M KOH+2 mM cobalt salen) was measured at three different temperatures: 25° C., 50° C., and 70° C. The catalyst had much high reduction current density at 50° C. and 70° C. as compared to 25° C. This higher reduction current appears to be caused, at least in part, by the further reduction of hydroperoxide to hydroxide. The catalyst also had a steeper reduction curve at 70° C. than at 50° C., implying that the chemisorption of the hydroperoxide on the Au surface was favored at high temperatures. In addition, an anodic peak current density decreased with increasing temperature, which is believed to be due to less production of peroxide. Since the catalytic activity of a pure polycrystalline gold electrode for peroxide production is also greatly changed by increasing temperature, this similar data for the gold/cobalt salen combination indirectly suggests that Au is mainly responsible for the reversible nature of the catalytic activity of the catalyst (while the cobalt salen is believed to be responsible for reactant centralization and reaction kinetics).

pH:
To determine the effects of pH on the catalytic activity of the Au/cobalt salen catalyst, a series of CV studies were performed using a cobalt salen film-modified polycrystalline gold electrode in oxygen saturated alkaline electrolytes having different concentrations of KOH: 0.01 M KOH, 0.1 M KOH, 1 M KOH, and 3 M KOH. Based on the shape of the CVs, it was determined that the catalyst worked well in 1 M KOH and 3 M KOH. For 0.1 M and 0.01 M KOH solutions, the reversibility started to deteriorate with lower KOH concentration. This observation could be related to a change in the composition of the double layer near the electrode surface when the alkaline concentration is low and to the mechanism of peroxide oxidation being sensitive to the double layer structure. Alternatively or additionally, this observation could be related to changes in the decomposition rate of hydroperoxide ion when the hydroxyl radical concentration becomes lower.

Example 4

Effects of Peroxide Stabilizer

During the oxidation reduction process of the presently disclosed Au/cobalt salen systems, hydroperoxide can be produced by electrochemical oxygen reduction and then chemically decomposes in alkaline environment. To reduce battery recharge overpotential and to increase recharge speed, peroxide can be preserved. Since peroxide self-decomposition can be related to Fenton processes caused by transition metal ions (see Croft et al., *J. Chem. Soc. Perkin Trans.* (1992) 2, 153-160), transition metal ion defunctionalizers can be used as peroxide stabilizers. For instance, a commonly used compound is sodium silicate, which can stabilized peroxide with or without transition metal ions. Transition metal complexing or chelating agents, such as DTPA and EDTA can also be used as peroxide stabilizers.

Accordingly, EDTA was selected as an exemplary electrolyte additive to stabilize peroxide, and CV of a cobalt salen film modified polycrystalline gold electrode was performed in an oxygen saturated electrolyte containing 1 M KOH and 1 M EDTA. The ratio of peak reduction current density over peak oxidation current density was 1:0.99, which indicates that the peroxide produced in the oxygen reduction process is essentially all oxidized back. This also further indicates that for the Au/cobalt salen catalyst, the oxygen reduction process is a pure two electron reduction process, since the reduction product can be oxidized without going to higher overpotential.

Example 5

Electropolymerization of Cobalt Salen

Since the electropolymerization potential of salen is out of the aqueous electrochemical window, electropolymerization of cobalt salen was carried out in an organic electrolyte environment. Thus, a solution comprising 2 nM cobalt salen and 50 mM TMBAF$_4$ was prepared in acetonitrile and electropolymerized on a polycrystalline gold electrode (scan rate 50 mV/sec.). For comparison, cobalt salen was also electropolymerized on a high density pyrolytic graphite (BHPG) electrode. With the BHPG electrode, current-potential curves of the progress of the oxidative electropolymerization of cobalt salen showed that peaks at 1.35 V developed. In addition, a peak for Co(II/III) at 0.4 V diminished while a peak for Co(I/II) at −1.2 V increased with repeated scanning. A greenish film was formed. In a plot showing curves for 12 cycles of CV for the gold electrode, the Co(II/IIII) peak shifted positive and appeared sharper than in the curves for electropolymerization on the BHPG electrode, indicating that Co$^{2+}$ oxidation was becoming more difficult. Without being bound to any one theory, this shift could also suggest that surface reconstruction was occurring. Thus, electropolymerization of cobalt salen on gold appears to not only provide a stable, insoluble film on the gold surface to stabilize the cobalt salen/gold combination, but could also provide a stable gold surface reconstruction.

Figure 4A:
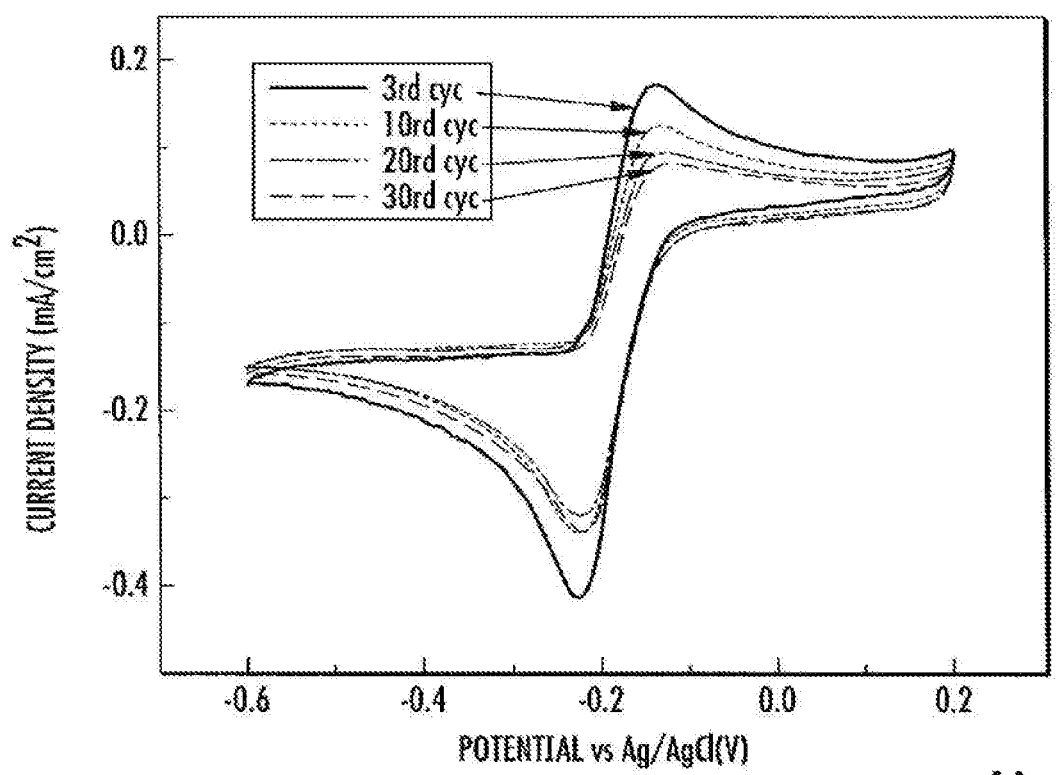
FIG. 4A is a graph showing the cyclic voltammetry (CV) comparison of the catalytic activity of a gold electrode with free cobalt salen in an electrolyte comprising 1 Molar (1M) potassium hydroxide (KOH) saturated with oxygen after 3, 10, 20, and 30 cycles. The scan rate was 50 milliVolts per second (mV/s). The reference electrode was silver chloride (AgCl) and the counter electrode was gold wire.
Figure 4B:
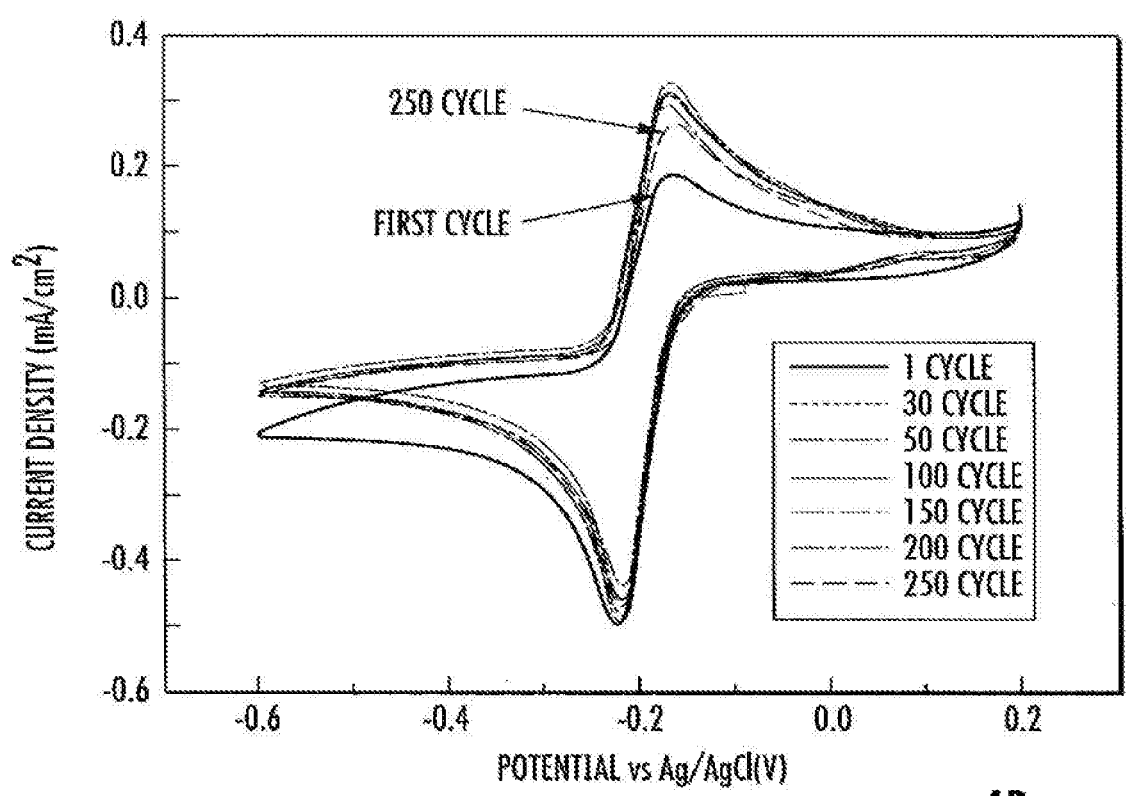
FIG. 4B is a graph showing the cyclic voltammetry (CV) comparison of the catalytic activity of a gold electrode having electropolymerized cobalt salen at the surface in an electrolyte comprising 1 Molar (1 M) potassium hydroxide (KOH) saturated with oxygen after 1, 30, 50, 100, 150, 200, and 250 cycles. The scan rate was 50 milliVolts per second (mV/s). The reference electrode was silver chloride (AgCl) and the counter electrode was gold wire.

After electropolymerization, the modified electrode was tested in 1 M KOH electrolyte to assess effects of the polymerization on ORR. See FIG. 4B. By comparing FIG. 4B to FIG. 4A (which shows CVs of free cobalt salen on an Au electrode), it can be seen that after the cobalt salen has been electropolymerized on the Au surface, the catalyst goes through a break-in (the first cycle showed relatively poorer reversibility), and then displays better catalytic stability, than cobalt salen in solution in contact with the Au.

Scanning electron microscopy was used to further inspect an electropolymerized cobalt salen film on an Au sputtered gas diffusion electrode (GDE). Using the same conditions as with the polycrystalline gold electrode, a non-homogenous film was formed. Elemental mapping indicated that the coverage of modification was good and that the elemental composition of the film was as expected.

Example 6

Thiophene-Modified Cobalt Salen

Scheme 1: Thiophene-modified cobalt salen

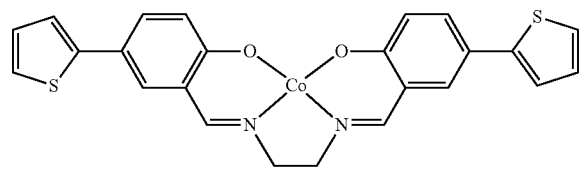

Thiophene-modified cobalt salen was prepared by a two step process. First, thiophene modified salicylaldehyde was synthesized by 5-Bromosalicylaldehyde and thiophene-2-boronic acid by Suzuki reaction method. Then the target chemical was made by the condensation of the first step product and ethylenediamine.

Figure 5:
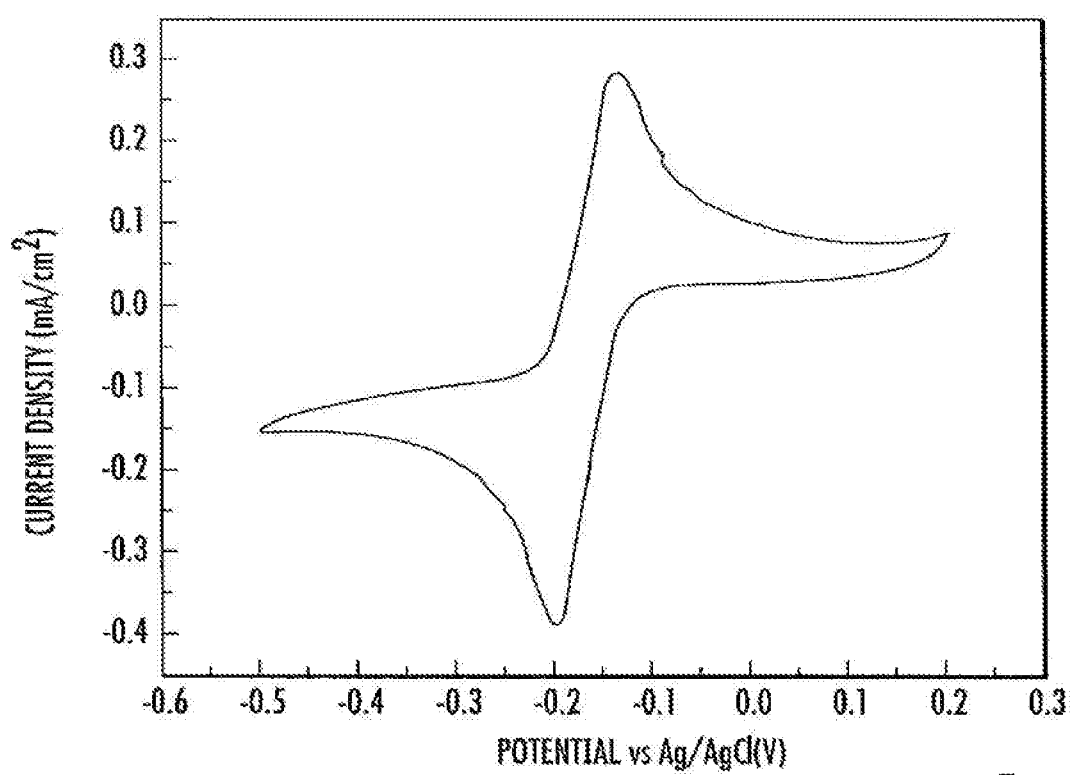
FIG. 5 is a cyclic voltammagram (CV) of electropolymerized thiophene modified cobalt salen on a gold electrode in a 1 Molar (1 M) potassium hydroxide (KOH) electrolyte saturated with oxygen. The scan rate was 50 millVolts per second (mV/s). The reference electrode was silver chloride (AgCl) and the counter electrode was gold wire.

Thiophene-modified cobalt salen was electropolymerized on a polycrystalline gold electrode as described above in Example 4 for cobalt salen to form a film. It was observed to be easier to polymerize than an original cobalt salen electropolymerized film. FIG. 5 shows the CV of the thiophene-modified cobalt salen-modified gold electrode in alkaline electrolyte (1 M KOH saturated with oxygen).

Example 7

Production of Hydrogen Peroxide

Figure 6:
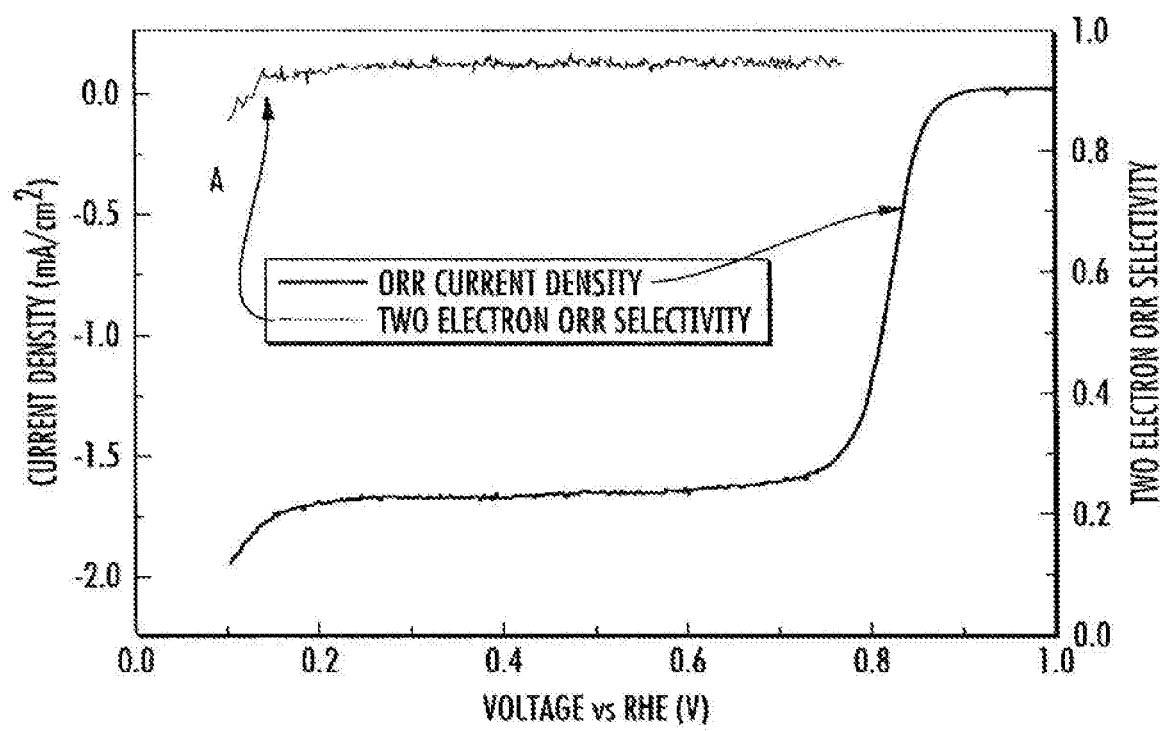
FIG. 6 is a graph showing the relationship between oxygen reduction reaction (ORR) current density and two electron ORR selectivity using a gold/cobalt salen catalyst (cobalt salon film on a gold rotating ring disk electrode (RRDE)) in a 1 Molar (1 M) potassium hydroxide (KOH) electrolyte. The reference electrode was a reversible hydrogen electrode (RHE).
Figure 7A:
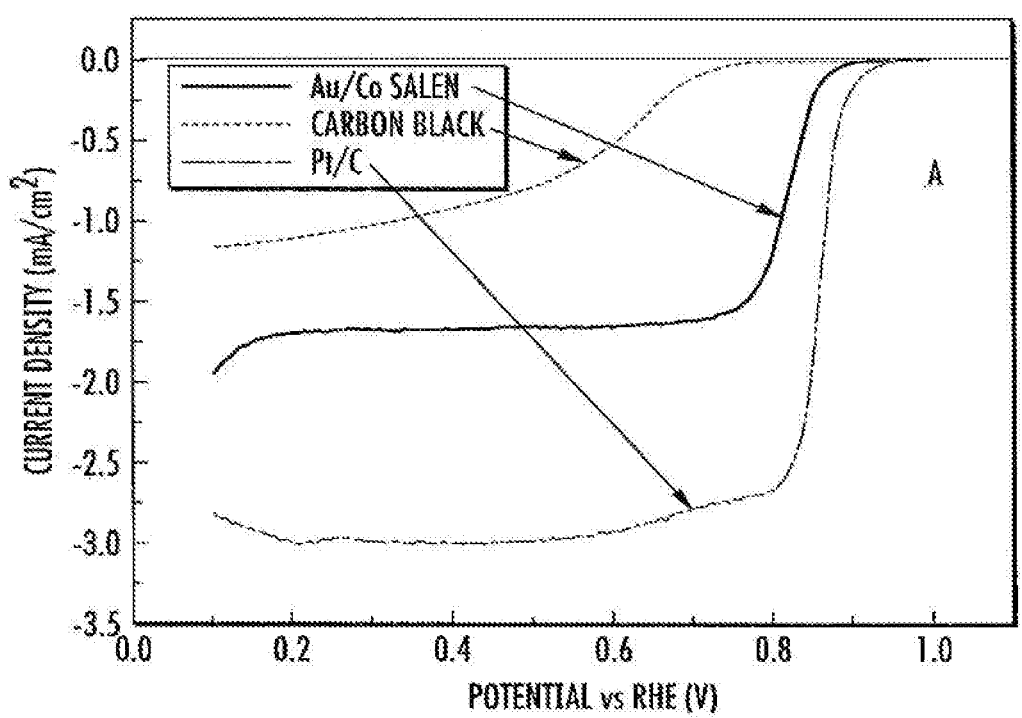
FIG. 7A Is a graph comparing the oxygen reduction reaction (ORR) current density (milliampere/square centimeters ($mA/cm^2$)) of a conventional peroxide producing catalyst (i.e., carbon black), a gold/cobalt salen catalyst, and a typical proton exchange membrane fuel cell catalyst (i.e., platinum (Pt) on carbon). The ORR was performed using a rotating disk electrode: 10 milliVolts per second (mV/s); 1000 revolutions per minute (rpm); and using a reversible hydrogen electrode (RHE) in 1 Molar (1 M) potassium hydroxide (KOH) as the electrolyte.
Figure 7B:
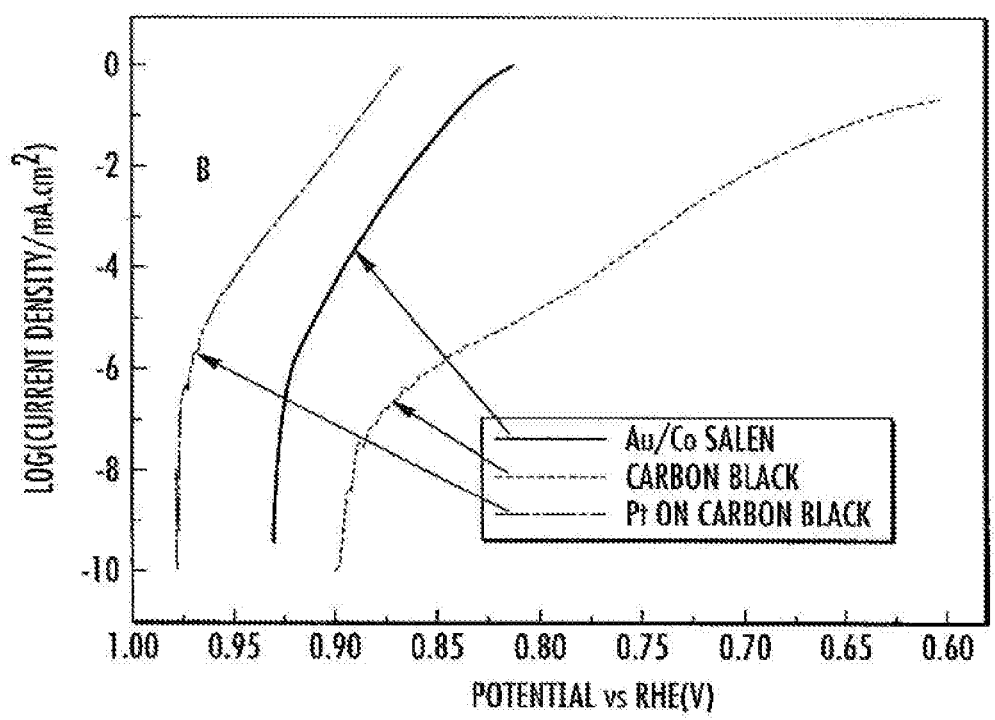
FIG. 7B is a graph of the tafel plots from the catalysts described for FIG. 7A.

FIG. 6 shows results from an RRDE experiment to determine the electron transfer number of the presently disclosed catalysts using a RRDE electrode comprising the catalyst deposited on the disk electrode. FIG. 7A shows data from RDE studies of catalyst catalytic activity using a carbon catalyst (carbon black), a Pt/C catalyst (i.e., Pt on carbon black), and a presently disclosed catalyst (Au/cobalt salen). FIG. 7B shows the tafel plots for the catalysts (i.e., C, Au/cobalt salen, and Pt/C) from FIG. 7A, which demonstrate the differences in kinetic performance of the catalysts.

The Au/cobalt salen catalyst promotes oxygen reduction with higher kinetics and onset potential than carbon, while still remaining over 90% selective for two electron oxygen reduction over a wide potential range. See FIGS. 6 and 7A. As seen in FIG. 6, the catalyst (i.e., Au/cobalt salen, weight ratio about 1:10), has good catalyst activity and remains two electron reduction over a wide potential range. In FIG. 7A, the Au/cobalt salen shows much higher reduction onsite potential then carbon and only a little lower then Pt/C. In addition, as shown in FIG. 7B, the kinetic performance of the Au/cobalt salen catalyst was comparable with Pt, the most commonly used ORR catalyst in high performance fuel cell systems, while the current density difference (see FIG. 7A) shows the difference between the two electron ORR and four electron ORR of Pt.

Figure 8B:
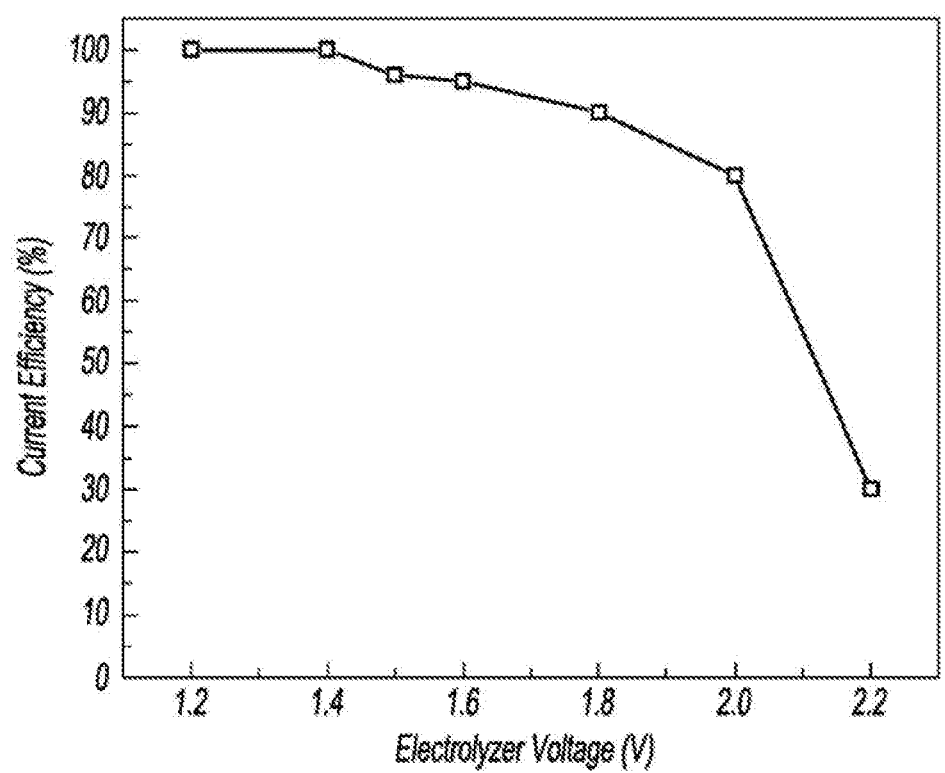
FIG. 8B is a graph of the current efficiency versus the electrolytic cell operation voltage for the electrolyser of FIG. 8A.

The flow field design for high current density fuel cells has recently been significantly advanced. However, this knowledge is not as useful if the fuel cell is built based on a low performance carbon ORR catalyst. Based on the presently disclosed high performance two electron ORR catalyst, existing knowledge of fuel cell flow field design can be adopted to build better high performance and highly efficient fuel cells to produce hydrogen peroxide. FIG. 8A shows the design of electrolytic cells for hydrogen peroxide. FIG. 8B is related with the electrolyzer, and the cell structure is described herein above. It uses nickel mesh as OER catalyst and AEM in the middle. The ORR catalyst used in this experiment is Au mesh electropolymerized with cobalt salen). The cell includes a gas diffusion electrode as the cathode, wherein the gas diffusion electrode includes a surface layer modified with an Au/cobalt coordination complex catalyst. More particularly, 5-10 nm Au nanoparticles were deposited on the surface via sputtering. Then, the Au covered substrate was electropolymerized in a manner analogous to that described in Example 5. The cathode can also provide humidified $O_2$ and allows aqueous hydrogen peroxide solution to be removed. The anode can allow oxygen evolution. The reactions at the anode and cathode of the cell are as follows:

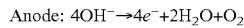
Anode: $4OH^-\rightarrow 4e^-+2H_2O+O_2$

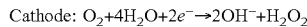
Cathode: $O_2+4H_2O+2e^-\rightarrow 2OH^-+H_2O_2$

Potassium permanganate was used to characterize peroxide production. FIG. 8B shows that the peroxide producing current efficiency of the catalyst can be over 90% in a wide potential range.

Example 8

Reversible Air Battery

A zinc air battery system comprising an Au/Co salen catalyst layer can be prepared. See FIG. 9A. The battery can comprise a zinc electrode (e.g., a porous zinc electrode) and an air electrode that allows humidified oxygen to enter the system. The reactions at the zinc electrode and the air electrode are as follows:

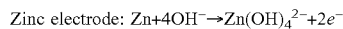
Zinc electrode: $Zn+4OH^-\rightarrow Zn(OH)_4^{2-}+2e^-$

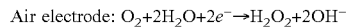
Air electrode: $O_2+2H_2O+2e^-\rightarrow H_2O_2+2OH^-$

Figure 9B:
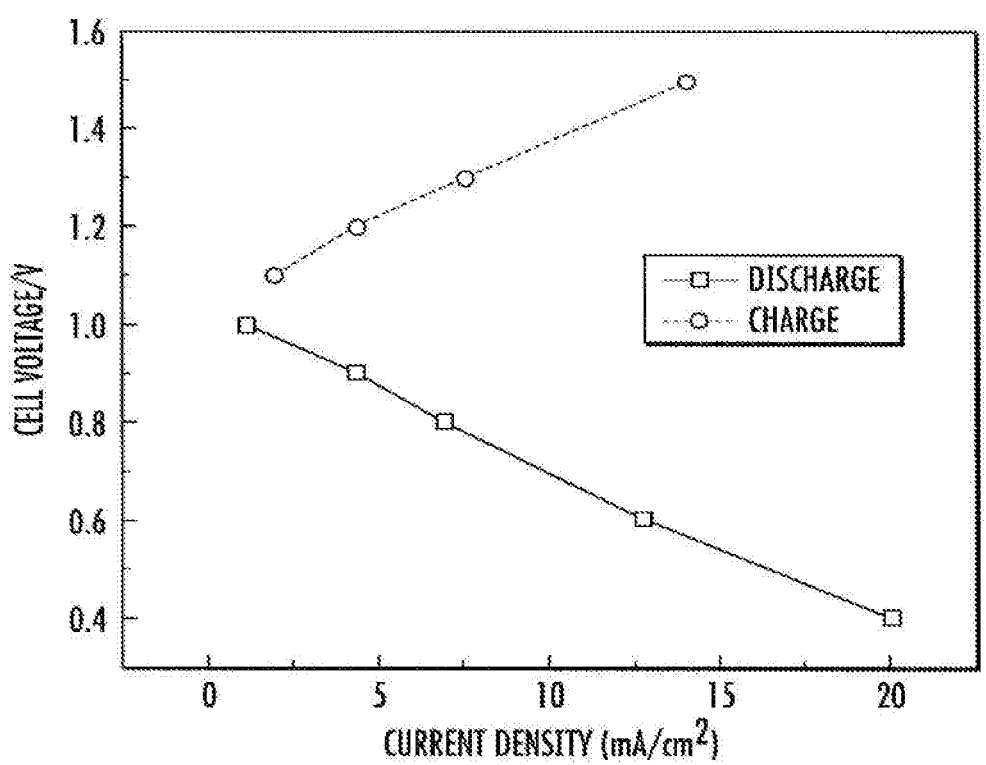
FIG. 9B is a graph of the charge (circles) and discharge (squares) polarization curves of the zinc air battery described for FIG. 9A

An anion exchange membrane comprising any desired material as would be apparent to one of ordinary skill in the art upon a review of the instant disclosure, including but not limited to materials disclosed in G. Merle et al., Journal of Membrane Science 377 (2011) 1-35) can be used to separate the zincate from the air electrode and to provide an alkaline working environment. Hydrogen peroxide solution can be produced during the discharge and preserved out of the cell. The polarization performance of a system similar to that of FIG. 9A is shown in FIG. 9B. The electrolyte used in this experiment is 1M KOH+2 mM Cobalt salen+10 mM EDTA, rather than the water solution in the graph. In some embodiments, an AEM is employed that allows for the KOH solution not to be used. In this case, the modified cobalt salen is used on the catalyst layer, and water and small amount of peroxide stabilizer is used as electrolyte. Assuming that the concentration of peroxide can reach 50 weight % to 80 weight % out of the cell at the end of the discharge, the energy densities for this kind of zinc air battery are calculated to be 397 Wh/kg to 489 Wh/kg.

Example 9

Nano-Size Gold-Based Catalyst

The use of nanoscale catalysts opens up a number of possibilities of improving catalytic activity and selectivity. Besides the increase in surface area, the catalytic properties of catalyst can also be greatly influenced by nano size. Both the bulk atom to surface atom ratio and the edge to surface ratio are greatly increased. Since the catalyst working mechanism often is based on the interaction between the catalyst and the reactant, the particle edge catalytic activity is different from particle surface. Therefore, when these two ratios increase to several magnitudes larger than the bulk phase, this will have a great influence on catalytic activity.

Nano gold particles with size over 8 nm generally have similar catalytic activity to bulk phase Au. Therefore, a first experiment involved making a nano Au particle size in the range of 8 nm to 25 nm. One of the simplest ways to produce Au nanoparticle of this size is use trisodium citrate as reducing agent to reduce hydrogen tetrachloroaurate in solution. In this method, the size of the particle is controlled by the reaction time and temperature. After three hours reaction, the particle size is approximately between 15 nm to 20 nm. The actual particle size is measured by XRD experiment, as described in Example 1 herein above.

A nano Au particle was deposited on an electronically conductive support, carbon or titanium oxide. Carbon black, Vulcan XC-72, was used for the experiment. Since carbon supports provide most of the surface area for the electrode and are two electron ORR catalysts, cobalt salen solution was not used to modify the Au on carbon catalyst. The alternative method employed was to have cobalt salen dissolved in the ink to form an electrode.

The ink composition and preparation method are described in Example 1. Depositing the ink onto RDE electrode also follows the previous description in Example 1. To verify whether cobalt salen and Au nano particle have a strong interaction, the easiest method is a continuous CV in nitrogen purged alkaline solution. A continuous 40 cycles CV just after this electrode was immersed into the solution was observed. The tendency showed in this CV indicates the interaction between cobalt salen and electrode gets weaker with time after immersion into solution. The cobalt salen, which was previously dissolved in the solution, diffuses into the bulk alkaline solution. However, it is believed that this interaction should have sufficient influence on the surface properties of Au nano particles to change the ORR catalytic activity of the catalyst.

To verify this, a comparison experiment was designed. Using the same Au on C powder, another ink with the same composition except for the cobalt salen was made. The catalytic activity of these two catalysts was tested under the same conditions.

Figure 13:
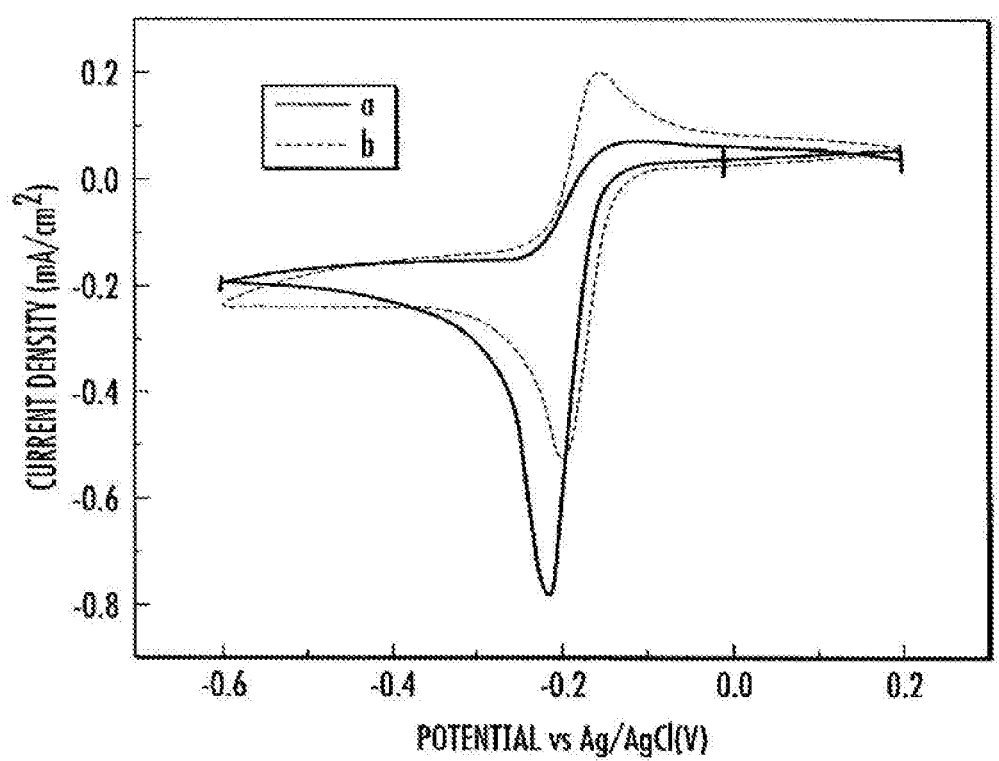
FIG. 13 is a graph showing a comparison of ORR CV on (Au/C-a) catalyst (a. without cobalt salen b. with cobalt salen in the preparation ink) in O2 saturated 1M KOH solution.

In a pure 1M KOH solution, this comparison experiment shows exactly the same difference with previous results on bulk Au electrode. The catalyst made from ink without cobalt salen shows no sign of reversibility and almost no sign of peroxide oxidation. On the other hand, the catalyst made from ink with cobalt salen shows very good reversibility and peroxide oxidation. However, the reversibility for Au on a carbon catalyst modified with cobalt salen does not show reversibility similar to the bulk Au electrode. Two possible reasons for this are that (1) the carbon support is actually producing peroxide but not oxidizing it back, so the overall reversibility of the electrode is not very good and (2) the surface area of nano Au in specific area is larger than for the bulk Au electrode and the peroxide produced is more likely to be further reduced. See FIG. 13.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An electrochemical cell comprising:
    an air electrode in flow communication with a storage tank containing an aqueous solution of hydrogen peroxide;
    a metal electrode;
    a catalyst layer in contact with the air electrode or a gas diffusion layer associated with the air electrode; and
    a separator layer in contact with the metal electrode and catalyst layer, wherein the catalyst layer includes a catalyst for two electron reversible oxygen reduction, wherein the catalyst comprises (a) gold and (b) a cobalt coordination complex or polymer thereof, and wherein the cobalt coordination complex comprises a cobalt ion chelated by a tetradentate organic chelating ligand.

2. The electrochemical cell of claim 1, wherein the tetradentate organic chelating ligand is N,N'-bis(salicylidene)ethylenediamine.

3. The electrochemical cell of claim 1, wherein the cobalt coordination complex has a structure of Formula

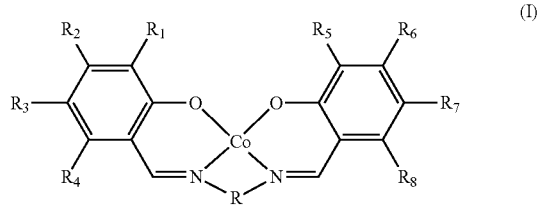

wherein each of $R_1$, $R_2$, $R_3$, $R_4$, $R_5$, $R_6$, $R_7$ and $R_8$ is independently selected from the group consisting of H, alkyl, cycloalkyl, aralkyl, aryl, heteroaryl, alkoxy, aryloxy, aralkoxy, thioalkyl, thioaralkyl, thioaryl, aminoalkyl, aminoaralkyl, aminoaryl, and a conducting polymer, and wherein R is alkylene or arylene.

4. The electrochemical cell of claim 1, wherein the cobalt coordination complex has a structure of Formula (I):

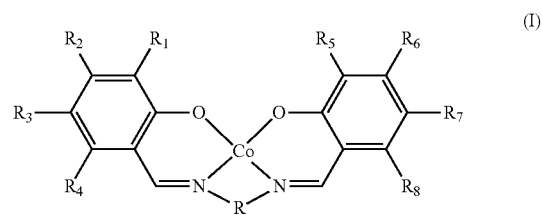

wherein each of $R_1$, $R_2$, $R_3$, $R_4$, $R_5$, $R_6$, $R_7$, and $R_8$ is independently selected from the group consisting of H, $C_{1-20}$ alkyl, cycloalkyl having 3 to 10 carbon atoms, $C_{1-20}$ alkoxy, $C_{1-20}$ thioalkyl, $C_{1-20}$ aminoalkyl, and a conducting polymer, and wherein R is $C_{1-20}$ alkylene or arylene.

5. The electrochemical cell of claim 1, wherein the separator layer is selected from the group consisting of a liquid organic electrolyte, a polymer electrolyte, an aqueous electrolyte, a solid-state electrolyte, and a porous insulative film impregnated with electrolyte solution.

6. The electrochemical cell of claim 1, wherein the metal electrode is porous.

7. The electrochemical cell of claim 1, wherein the aqueous solution of hydrogen peroxide comprises a peroxide stabilizer selected from the group consisting of sodium silicate, a transition metal ion complexing agent, and a transition metal chelating agent.

8. The electrochemical cell of claim 1, wherein the aqueous solution of hydrogen peroxide comprises a peroxide stabilizer selected from the group consisting of ethyllenediamine tetraacetic acid (EDTA), diethylenetriaminepentaacetic acid (DTPA), and a phosphonate.

9. The electrochemical cell of claim 1, wherein hydrogen peroxide is transferred out of the electrochemical cell for storage, purification, or stabilization.

10. The electrochemical cell of claim 1, wherein the metal electrode is a lithium electrode.

* * * * *